United States Patent
Bentley et al.

(10) Patent No.: US 9,311,960 B1
(45) Date of Patent: Apr. 12, 2016

(54) EFFICIENT MULTICHANNEL DATA FORMAT USING VARIABLE-LENGTH HEADERS

(71) Applicant: International Business Machines Corporation, Armonk, NY (US)

(72) Inventors: Steven R. Bentley, Tucson, AZ (US); Roy D. Cideciyan, Rueschlikon (CH); Simeon Furrer, Altdorf (CH); Kenji Ohtani, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/675,600

(22) Filed: Mar. 31, 2015

(51) Int. Cl.
*G11B 20/18* (2006.01)
*G11B 20/12* (2006.01)
*G11B 5/09* (2006.01)
*G11B 27/36* (2006.01)

(52) U.S. Cl.
CPC .............. *G11B 20/1833* (2013.01); *G11B 5/09* (2013.01); *G11B 20/1201* (2013.01); *G11B 27/36* (2013.01)

(58) Field of Classification Search
CPC .. G11B 20/1833; G11B 5/09; G11B 20/1201; G11B 27/36; G11B 15/07; G11B 20/1883; G11B 2020/183; G11B 2220/20; G11B 5/00813; G06F 3/0601; G06F 3/0616
USPC ............... 360/40, 31, 48, 72.2, 77.12; 386/95
See application file for complete search history.

(56) References Cited

U.S. PATENT DOCUMENTS

| | | | |
|---|---|---|---|
| 5,592,342 A | 1/1997 | Hall et al. | |
| 7,561,372 B2 | 7/2009 | Shiratori | |
| 8,276,044 B2 | 9/2012 | Masuda et al. | |
| 2013/0326311 A1* | 12/2013 | Cideciyan | G11B 5/00813 714/771 |

OTHER PUBLICATIONS

Cideciyan et al., U.S. Appl. No. 14/675,589, filed Mar. 31, 2015.
List of IBM Patents or Patent Applications Treated As Related.

* cited by examiner

*Primary Examiner* — Ali Neyzari
(74) *Attorney, Agent, or Firm* — Zilka-Kotab, PC

(57) ABSTRACT

In one embodiment, a system includes a controller and logic integrated with and/or executable by the controller, the logic being configured to write a data set to a first write section of a magnetic medium, the data set including a plurality of sub data sets, each including a data array organized in rows and columns, each row of the data array including a CWI-4. A first portion of the data set is stored as CWI-4 sets to the first write section of the magnetic medium with first headers. The logic is also configured to rewrite at least some of the data set as rewritten CWI-4 sets to a rewrite section of the magnetic medium as rewritten CWI-4s having corresponding rewrite headers. A length of any one of the rewrite headers is greater than a length of any one of the first headers.

20 Claims, 19 Drawing Sheets

Figures 2A, 2B:
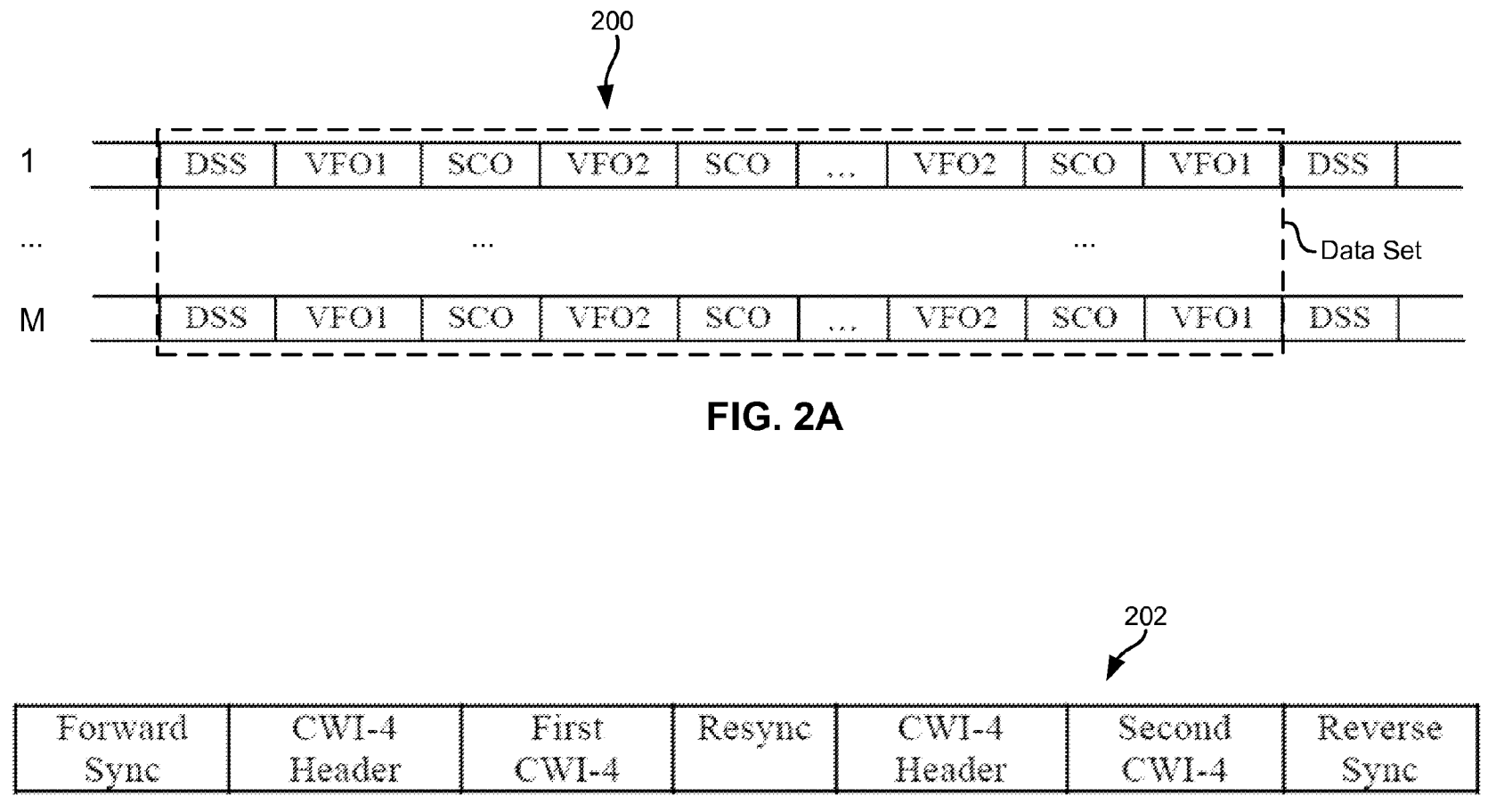

| DSS | VFO1 | SCO | ... | VFO2 | SCO | ... | VFO2 | SCO | VFO1 | DSS |
|-----|------|-----|-----|------|-----|-----|------|-----|------|-----|
| ... | | | | | | | | | | |
| DSS | VFO1 | SCO | ... | VFO2 | SCO | ... | VFO2 | SCO | VFO1 | DSS |

1 ... M

Data Set

| Forward Sync | CW1-4 Header | First CW1-4 | Resync | CW1-4 Header | Second CW1-4 | Reverse Sync |
|---|---|---|---|---|---|---|

| | 7 | 6 | 5 | 4 | 3 | 2 | 1 | 0 |
|---|---|---|---|---|---|---|---|---|
| Byte 0 (H0) | AF | AWT | Data Set Id Fragment (DSIF) | | | | | |
| Byte 1 (H1) | ACN | | | | | | | |
| Byte 2 (H2) | ACN (cont) | CWI-4 Designation (CWID) | | | | | | |
| Byte 3 (H3) | | | | | | | | |
| Byte 4 (H4) | Reserved Bits (RB) | | | | | | | |
| Byte 5 (H5) | | | | | | | R | F |

300

12-Byte Header for Rewrite Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| AF | RF | Data Set ID Fragment | | | | | | AWT | Rsv | | | | | | | ACN | | | | | | | | Reserved | | | | | | | |

| BYTE 4 | | | | | | | | BYTE 5 | | | | | | | | BYTE 6 | | | | | | | | BYTE 7 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | CWI Designation | | | | | | | | | | | | | Reserved | | | | | | | | Write Pass [21:16] | | | | | | | |

| BYTE 8 | | | | | | | | BYTE 9 | | | | | | | | BYTE 10 | | | | | | | | BYTE 11 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Header Parity | | | | | | | | | | | | | | | |

4-Byte Header With Markers for First Write Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| marker | Data Set ID Fragment | | | | | | | AWT | Write Pass [21:0] | | | | | | | | | | | | | | | | | | | | | | |

FIG. 5B

12-Byte Header for Rewrite Section

| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| \multicolumn{8}{c\|}{BYTE 0} | \multicolumn{8}{c\|}{BYTE 1} | \multicolumn{8}{c\|}{BYTE 2} | \multicolumn{8}{c\|}{BYTE 3} |
| AF | RF | \multicolumn{6}{c\|}{Data Set ID Fragment} | AWT | \multicolumn{3}{c\|}{Rsv} | \multicolumn{12}{c\|}{ACN} | \multicolumn{8}{c\|}{Reserved} |
| \multicolumn{8}{c\|}{BYTE 4} | \multicolumn{8}{c\|}{BYTE 5} | \multicolumn{8}{c\|}{BYTE 6} | \multicolumn{8}{c\|}{BYTE 7} |
| \multicolumn{2}{c\|}{Rsv} | \multicolumn{14}{c\|}{CWI Designation} | \multicolumn{16}{c\|}{Reserved} |
| \multicolumn{8}{c\|}{BYTE 8} | \multicolumn{8}{c\|}{BYTE 9} | \multicolumn{8}{c\|}{BYTE 10} | \multicolumn{8}{c\|}{BYTE 11} |
| \multicolumn{16}{c\|}{Write Pass [15:0]} | \multicolumn{16}{c\|}{Header Parity} |

4-Byte Header for First Write Section

| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| \multicolumn{8}{c\|}{BYTE 0} | \multicolumn{8}{c\|}{BYTE 1} | \multicolumn{8}{c\|}{BYTE 2} | \multicolumn{8}{c\|}{BYTE 3} |
| AWT | \multicolumn{7}{c\|}{Data Set ID Fragment} | \multicolumn{9}{c\|}{CWI Designation [13:5]} | \multicolumn{16}{c\|}{Write Pass [15:0]} |

FIG. 6B

12-Byte Header for Rewrite Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| AF | RF | Data Set ID Fragment | | | | | | AWT | | | | Rsv | | | | ACN | | | | | | | | Reserved | | | | | | | |
| BYTE 4 | | | | | | | | BYTE 5 | | | | | | | | BYTE 6 | | | | | | | | BYTE 7 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | CWI Designation | | | | | | | | | | | | | Reserved | | | | | | | | Write Pass [23:16] | | | | | | | |
| BYTE 8 | | | | | | | | BYTE 9 | | | | | | | | BYTE 10 | | | | | | | | BYTE 11 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Header Parity | | | | | | | | | | | | | | | |

8-Byte Header for First Write Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | Data Set ID Fragment | | | | | AWT | | | | Reserved | | | | CWI Designation [13:5] | | | | | | | | | | | | Write Pass [23:16] | | | |
| BYTE 4 | | | | | | | | BYTE 5 | | | | | | | | BYTE 6 | | | | | | | | BYTE 7 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Reserved | | | | | | | | | | | | | | | |

FIG. 7B

12-Byte Header for Rewrite Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| AF | RF | Data Set ID Fragment | | | | | | AWT | Rsv | | | | | | | ACN | | | | | | | | Reserved | | | | | | | |
| BYTE 4 | | | | | | | | BYTE 5 | | | | | | | | BYTE 6 | | | | | | | | BYTE 7 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | CWI Designation | | | | | | | | | | | | | | | | | | | | | Write Pass [23:16] | | | | | | | |
| BYTE 8 | | | | | | | | BYTE 9 | | | | | | | | BYTE 10 | | | | | | | | BYTE 11 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Reserved | | | | | | | | Header Parity | | | | | | | |

8-Byte Header for First Write Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | Data Set ID Fragment | | | | | AWT | | | Reserved | | | | | CWI Designation [13:5] | | | | | | | | Write Pass [23:16] | | | | | | | |
| BYTE 4 | | | | | | | | BYTE 5 | | | | | | | | BYTE 6 | | | | | | | | BYTE 7 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Reserved | | | | | | | | | | | | | | | |

FIG. 8B

12-Byte Header for Rewrite Section

| | | | BYTE 0 | | | | | | | | BYTE 1 | | | | | | | | BYTE 2 | | | | | | | | BYTE 3 | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| AF | RF | Data Set ID Fragment | | | | | | AWT | Rsv | | | | | | | ACN | | | | | | | | Reserved | | | | | | | |

| | | | BYTE 4 | | | | | | | | BYTE 5 | | | | | | | | BYTE 6 | | | | | | | | BYTE 7 | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | CWI Designation | | | | | | | | | | | | | Reserved | | | | | | | | | | | | | | | |

| | | | BYTE 8 | | | | | | | | BYTE 9 | | | | | | | | BYTE 10 | | | | | | | | BYTE 11 | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Header Parity | | | | | | | | | | | | | | | |

4-Byte Header for First Write Section (even numbered CWI-4 sets)

| | | | BYTE 0 | | | | | | | | BYTE 1 | | | | | | | | BYTE 2 | | | | | | | | BYTE 3 | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| AWT | Data Set ID Fragment | | | | | | | CWI Designation [13:5] | | | | | | | | Write Pass [15:0] | | | | | | | | | | | | | | | |

FIG. 9B

12-Byte Header for Rewrite Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| AF | RF | Data Set ID Fragment | | | | | | AWT | | | | Rsv | | | | ACN | | | | | | | | Reserved | | | | | | | |
| BYTE 4 | | | | | | | | BYTE 5 | | | | | | | | BYTE 6 | | | | | | | | BYTE 7 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | CWI Designation | | | | | | | | | | | | | | | | | | | | | Write Pass [23:16] | | | | | | | |
| BYTE 8 | | | | | | | | BYTE 9 | | | | | | | | BYTE 10 | | | | | | | | BYTE 11 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Reserved | | | | | | | | Header Parity | | | | | | | |

8-Byte Header for First Write Section

| BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Rsv | | | Data Set ID Fragment | | | | | AWT | | | | Reserved | | | | CWI Designation [13:5] | | | | | | | | Write Pass [23:16] | | | | | | | |
| BYTE 4 | | | | | | | | BYTE 5 | | | | | | | | BYTE 6 | | | | | | | | BYTE 7 | | | | | | | |
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Write Pass [15:0] | | | | | | | | | | | | | | | | Reserved | | | | | | | | | | | | | | | |

EFFICIENT MULTICHANNEL DATA FORMAT USING VARIABLE-LENGTH HEADERS

BACKGROUND

The present invention relates to data storage, and more particularly, to an efficient multichannel data format using variable-length headers.

In modern mass data storage systems, such as magnetic tape storage devices, data which is written on the tape is protected by one or more error correction codes (ECCs). For data correction, data which is read from the tape is conceptually arranged into a large matrix and is protected by two orthogonal error correcting codes, referred to typically as C1 and C2. The large data matrix is referred to as a sub data set (SDS). The C1 code is used to correct the rows of the SDS and the C2 code is used to correct the columns. Furthermore, data is divided into multiple byte-interleaved C1 codewords in each row, referred to as a codeword interleave (CWI). This error correction methodology is very powerful. However, in order for this error correction methodology to work, the data has to be placed into the correct locations in the SDS. If the data's location cannot be determined, then the error correction methodology cannot be applied to this data. Therefore, the data location information is stored in a field called the header.

Furthermore, each header that is used to store data location information takes up space which could be allocated for data, thereby reducing the storage efficiency of data storage schemes which utilize headers and adding to overhead for storage of the data. Headers associated with CWIs that have been used in all linear tape open (LTO) and enterprise tape drives have a fixed size. For example, 10-byte headers have been used in the first four LTO tape drive generations (LTO-1 to LTO-4); 12-byte headers have been used in the last two LTO tape drive generations (LTO-5 and LTO-6); and it is anticipated that 12-byte headers will be used in future LTO tape drives (LTO-7).

BRIEF SUMMARY

In one embodiment, a system for writing data using variable-length headerized CWI-4 sets, the system including a controller and logic integrated with and/or executable by the controller, the logic being configured to cause performance of a first write of a data set to a first write section of a magnetic medium, the data set including a plurality of sub data sets, each sub data set including a data array organized in rows and columns, each row of the data array including four interleaved C1 codewords (a CWI-4), wherein a first portion of the data set is stored as CWI-4 sets to the first write section of the magnetic medium with first headers, a CWI-4 set including a fixed number of M concurrently written CWI-4s having M corresponding first headers. The logic is also configured to cause performance of a rewrite of at least some of the data set as rewritten CWI-4 sets to a rewrite section of the magnetic medium, wherein each rewritten CWI-4 set is stored to the rewrite section of the magnetic medium as M rewritten CWI-4s having M corresponding rewrite headers. The rewritten CWI-4 sets are determined based on errors being detected in CWI-4s stored in the first write section of the magnetic medium, and a length of any one of the rewrite headers is greater than a length of any one of the first headers.

In another embodiment, a method for writing data using variable-length headers includes writing data to a first write section of a magnetic tape, at least some of the data being written in association with first headers, selecting some of the data for rewrite based on detected errors, and rewriting the selected data to a rewrite section of the magnetic tape, the rewritten data being written in association with rewrite headers, with a length of each of the rewrite headers is greater than a length of each of the first headers.

According to another embodiment, a system for writing data using variable-length headers includes a controller and logic integrated with and/or executable by the controller. The logic is configured to write data to a first write section of a magnetic tape, at least some of the data being written in association with first headers, select some of the data for rewrite based on detected errors, and rewrite the selected data to a rewrite section of the magnetic tape, the rewritten data being written in association with rewrite headers. A length of each of the rewrite headers is greater than a length of each of the first headers.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 2A-2D show various headers associated with a four codeword interleave (CWI-4) data storage scheme.

FIG. 3 shows a CWI-4 header layout according to one embodiment.

FIG. 5B shows a header format for a rewrite section and for a first write section, according to one embodiment.

FIG. 6B shows a header format for a rewrite section and for a first write section, according to one embodiment.

FIG. 7B shows a header format for a rewrite section and for a first write section, according to one embodiment.

FIG. 8B shows a header format for a rewrite section and for a first write section, according to one embodiment.

FIG. 9B shows a header format for a rewrite section and for a first write section, according to one embodiment.

FIG. 10B shows a header format for a rewrite section and for a first write section, according to one embodiment.

DETAILED DESCRIPTION

Figure 1:
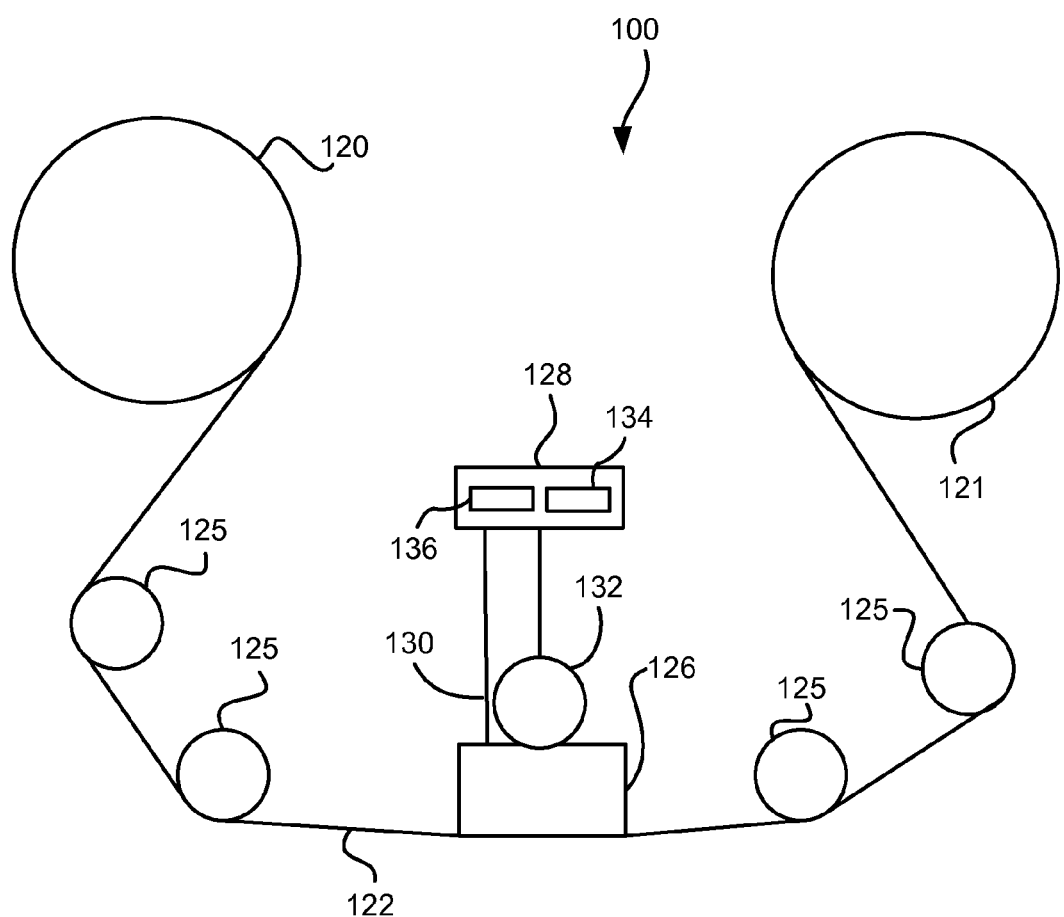
FIG. 1 illustrates a simplified tape drive of a tape-based data storage system, according to one embodiment.

The following description is made for the purpose of illustrating the general principles of the present invention and is not meant to limit the inventive concepts claimed herein.

Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Format efficiency is a measure (in percentage) of all bits written onto tape that correspond to user data (as opposed to data used for formatting, parity, etc.). User data is processed by error correction and modulation encoders, and headers and synchronization patterns are inserted, i.e., there are four primary sources that contribute to format overhead: 1) error correction coding, 2) modulation coding, 3) synchronization patterns, and 4) headers. Due to these sources of overhead, storage efficiency is not 100%. The format efficiency of linear tape open (LTO) generation 6 (LTO-6) tape storage, for example, is 78.9%. A significant part of the format overhead is due to fixed-length headers that are attached to rows of sub data sets (interleaved C1 codewords) that are written onto the tracks of the tape. 10-byte headers have been used in the first four LTO tape drive generations LTO-1 to LTO-4. 12-byte headers have been used in the last two LTO tape drive generations LTO-5 and LTO-6. 12-byte headers will also be used in LTO-7 tape drives. There is a sizable overhead of 1.3% that is associated with 12-byte headers in LTO. In the absence of headers, the format efficiency of LTO-6 tape storage would be about 80%. Therefore, new efficient formats that significantly reduce the overhead associated with headers are needed.

In the prior art, a fundamental data block written on each track is referred to as a Codeword Interleave (CWI), which refers to more than one Reed-Solomon (RS) codeword being interleaved when they are written onto magnetic tape. A CWI-4 includes four interleaved codewords. In one exemplary case, there may be 234 bytes of data and 12 bytes of parity in a codeword. Each codeword may be used to correct up to six errors. In this exemplary case, the header is a 12-byte field that is placed at the beginning of four codewords interleaved together.

As described previously, in LTO-5 and LTO-6, a 12-byte header is used and each 12-byte header is associated with a 960-byte four codeword interleave (CWI-4) corresponding to four byte-interleaved 240-byte C1 codewords that contain 230 bytes of information. It is assumed that C1 codewords contain 228 bytes of information for the sake of the following calculations.

Overhead associated with the use of 12-byte headers is 1.315% in these data storage formats with fixed length headers. In a 20 TB cartridge, 263 GB of additional user data may be stored if all the headers are eliminated, i.e., user capacity could be increased from 20 TB to 20.263 TB by eliminating the headers.

However, without the headers, it is not possible to determine where decoded information belongs in each CWI-4. Therefore, in one embodiment, variable length headers may be used. This space-varying header size allows for an increase in tape cartridge capacity of up to 1.311% (262 GB in a 20 TB cartridge), thereby eliminating almost all of the overhead associated with the inclusion of headers.

This is possible because, the data location information (referred to as CWI-4 Designation herein) is stored in only two bytes of each header. If an error occurs in the header, and an uncorrectable error occurs in either of the codewords that contain the CWI-4 Designation bits, then the entire CWI-4 will be lost. This is because it will not be possible to correctly place the data within the SDS. Three codewords may be correct and not contain any errors, but since the CWI-4 Designation bits have been lost, they cannot be correctly placed within the SDS.

In one embodiment, space-varying header sizes that almost eliminate all the overhead associated with headers may be used. The storage of about 175 GB to about 262 GB of additional user data is possible in a 20 TB cartridge, i.e., cartridge capacity may be increased from about 20 TB to about 20.175 TB to about 20.262 TB. The space-varying header sizes increase cartridge capacity up to about 1.3%, thus eliminating almost all of the overhead associated with headers. Various embodiments of these space-varying header sizes that account for interrupted data sets are presented.

In one general embodiment, a system for writing data using variable-length headerized CWI-4 sets, the system including a controller and logic integrated with and/or executable by the controller, the logic being configured to cause performance of a first write of a data set to a first write section of a magnetic medium, the data set including a plurality of sub data sets, each sub data set including a data array organized in rows and columns, each row of the data array including a CWI-4, wherein a first portion of the data set is stored as CWI-4 sets to the first write section of the magnetic medium with first headers, a CWI-4 set including a fixed number of M concurrently written CWI-4s having M corresponding first headers. The logic is also configured to cause performance of a rewrite of at least some of the data set as rewritten CWI-4 sets to a rewrite section of the magnetic medium, wherein each rewritten CWI-4 set is stored to the rewrite section of the magnetic medium as M rewritten CWI-4s having M corresponding rewrite headers. The rewritten CWI-4 sets are determined based on errors being detected in CWI-4s stored in the first write section of the magnetic medium, and a length of any one of the rewrite headers is greater than a length of any one of the first headers.

In another general embodiment, a method for writing data using variable-length headers includes writing data to a first write section of a magnetic tape, at least some of the data being written in association with first headers, selecting some of the data for rewrite based on detected errors, and rewriting the selected data to a rewrite section of the magnetic tape, the rewritten data being written in association with rewrite headers, with a length of each of the rewrite headers is greater than a length of each of the first headers.

According to another general embodiment, a system for writing data using variable-length headers includes a controller and logic integrated with and/or executable by the controller. The logic is configured to write data to a first write section of a magnetic tape, at least some of the data being written in association with first headers, select some of the data for rewrite based on detected errors, and rewrite the selected data to a rewrite section of the magnetic tape, the rewritten data being written in association with rewrite headers. A length of each of the rewrite headers is greater than a length of each of the first headers.

FIG. 1 illustrates a simplified tape drive 100 of a tape-based data storage system, which may be employed according to various embodiments. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 1) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Error Correction Code (ECC) is used in data storage to achieve very low bit error rates, e.g., magnetic tape storage products are designed to ensure bit error rates in the range of $1 \times 10^{-17}$ to $1 \times 10^{-19}$ under normal operating conditions. Linear block codes, such as Reed-Solomon (RS) codes and low-density parity-check (LDPC) codes, have generally been preferred ECC schemes used in data storage products.

Figure 2C:
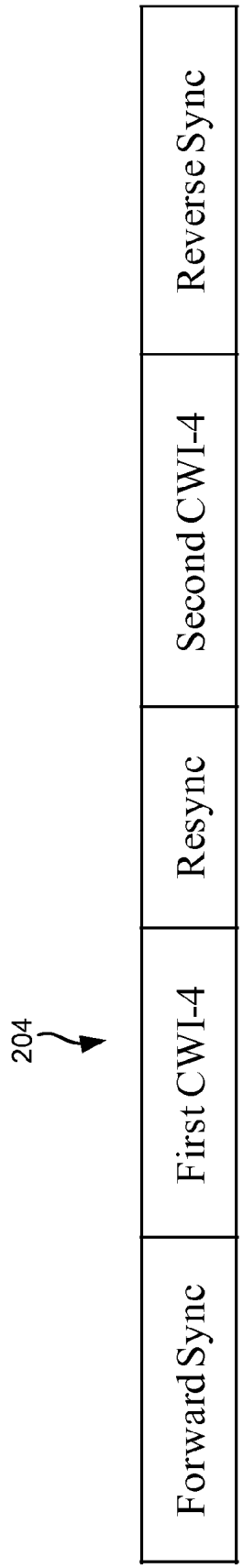

In FIG. 2A, a data set layout 200 having M concurrently written tracks is shown where a sequence of synchronized codeword objects (SCO) are written in each track. M also corresponds to the number of channels of a tape drive (e.g., for LTO-5 and LTO-6, M=16; for enterprise tape drives, M=32). Each data set starts with a data separating sequence field (DSS) and contains the various variable frequency oscillator fields (VFO1, VFO2) and SCO fields up to the next DSS field. FIG. 2B shows an SCO format 202 according to the prior art. In this layout, there are sixteen concurrently written tracks (M=16), and a CWI-4 header is twelve bytes, with each codeword in a CWI-4 being 240 bytes, with 4 codewords being 960 bytes total. FIG. 2C shows another SCO format 204 according to the prior art. In this layout, there are thirty-two concurrently written tracks (M=32) and the header is embedded in the CWI-4. Each codeword in a CWI-4 is 249 bytes, for a total for the four codewords in a CWI-4 of 996 bytes.

Figure 2D:
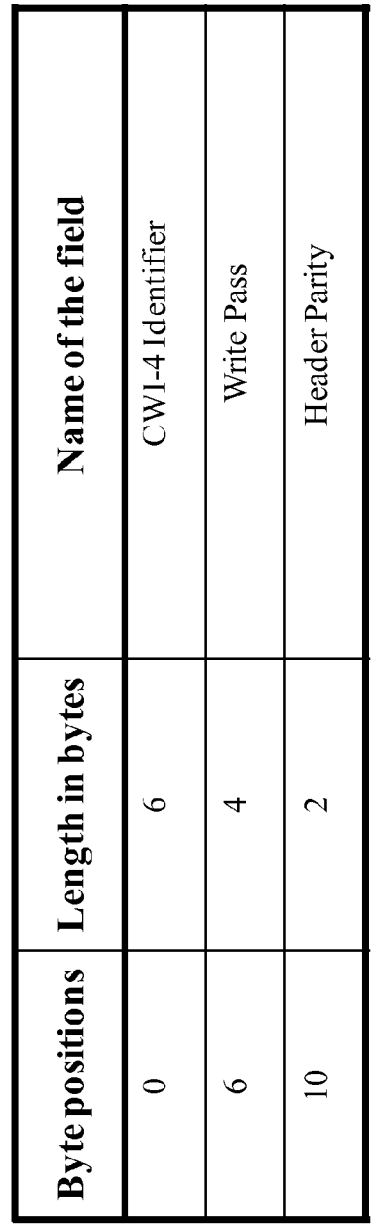

With reference to FIG. 2D, a 12-byte header 206 associated with a CWI-4 is shown in one embodiment. As shown, for bytes 0-11 (12 total bytes), the CWI-4 Identifier may be positioned at bytes 0-5 (6 bytes), the write pass at bytes 6-9 (4 bytes), and the header parity at bytes 10-11 (2 bytes). This is one embodiment of a layout for a CWI-4 header. Other possible byte distributions are also possible, as would be understood by one of skill in the art.

Any header which is included with a CWI-4 may be appended to a beginning, an end, or in some other way to its corresponding CWI-4, in various approaches. In alternate approaches, a header which is included with a CWI-4 may be embedded in the C1 codewords. Either of these approaches may be used in the context of the various embodiments described herein.

In one embodiment, a CWI-4 may include four interleaved C1 codewords, which represents a row of a sub data set. Furthermore, a CWI-4 set, written to a magnetic medium using a 16-channel magnetic head (capable of writing 16 tracks concurrently), may include 16 CWI-4s that are concurrently written on the magnetic medium, one CWI-4 for each of the tracks being written concurrently (which is the case for LTO-3, LTO-4, LTO-5, and LTO-6).

In another embodiment, a CWI-4 set written to a magnetic medium using a 32-channel magnetic head may include 32 CWI-4s that are concurrently written on the magnetic medium, one CWI-4 for each of the tracks being written concurrently (which is the case for enterprise tape drives).

For example, in one embodiment, a data set may include 384 CWI-4 sets. The data set is then written as 384 CWI-4 sets, each CWI-4 set including a fixed number, M, (8, 16, 32, 64, etc.) of CWI-4s written concurrently to M tracks of a magnetic medium.

In another embodiment, a data set may include 192 CWI-4 sets. The data set is then written as 192 CWI-4 sets, each CWI-4 set including a fixed number, M, (8, 16, 32, 64, etc.) of CWI-4s written concurrently to M tracks of a magnetic medium.

Of course, any number of CWI-4 sets may be included in a data set, and any number of tracks may have CWI-4s written concurrently thereto on the magnetic medium, in an approach that may be described as follows. P CWI-4 sets may be included in a data set, and M CWI-4s may be written concurrently through M channels to M tracks of a magnetic medium, where P>M, and where M and P each have a value that is modulo 8. Furthermore, modulo 8 may be any multiple of 8, such as 16, 32, 64, 192, 384, 768, etc. Additionally, P may be equal to two times N2, where N2 is the length (in symbols) of C2 codewords used in the encoding scheme. A symbol may be one or more bits in length, such as 1 byte.

In one embodiment, N2 may be an integer multiple (2, 3, 4, etc.) of a total number of concurrently written (or read) channels M. (e.g., M=16 for LTO-6 and M=32 in enterprise tape drives). Therefore, P may be, in some approaches, a multiple of M.

Now referring to FIG. 3, a CWI-4 header layout 300 is shown according to one embodiment, assuming 32 channels (tracks). Other numbers of channels are also possible, such as 8 channels, 16 channels, 64 channels, etc. A CWI-4 set comprises a fixed number, M, of concurrently written CWI-4s, the fixed number being equal to the number of channels in the writer. The CWI-4 header layout 300 includes many different fields. Each field is described separately below, according to various embodiments. The CWI-4 header layout 300 shown is not the only possible layout for a CWI-4 header, and the techniques, systems, and methods described herein may apply to other CWI-4 header layouts not specifically shown.

In the CWI-4 header layout 300, the Amble Flag (AF) is used to indicate whether the CWI-4 is an Amble CWI-4 or a Data CWI-4, and is included in Byte 0 (H0). In one approach, the AF may be set to ONE if the CWI-4 is an Amble CWI-4, and ZERO if the CWI-4 is a Data CWI-4. When the last CWI-4 set of a data set is written to tape, there may not be any subsequent data sets ready to be written to tape. Due to the requirements of the read-while-write latency, the writing device cannot determine that the data set is complete until the last CWI-4 set has been verified. In the interval between writing the last CWI-4 set and it being verified on the tape, more CWI-4 sets must be written. In this case, the writing drive may perform either of the following: 1) repeat CWI-4 sets from the end of the last data set until it has verified that there is a good copy of every CWI-4 in the data set, or 2) write Amble CWI-4 sets until the verification is complete. All CWI-4s in an Amble CWI-4 set are Amble CWI-4s. Amble and Data CWI-4s are not mixed within a CWI-4 set typically. Furthermore, all thirty-two AF fields (1 bit) within a CWI-4 set are the same.

The Adjacent Wrap Toggle (AWT) field is used to indicate which wrap the CWI-4 is used for, and is also included in Byte 0 (H0). The AWT may be set to the second least significant bit of the wrap number, e.g., ZERO for wraps 0, 1, 4, 5, etc., and ONE for wraps 2, 3, 6, 7, etc. Also, all thirty-two AWT fields (1 bit) within a CWI-4 set are the same.

The Data Set ID Fragment (DSIF) field contains the six least significant bits of the data set number, and is also included in Byte 0 (H0). All thirty-two DSIF fields (6 bits) within a CWI-4 set are the same.

The Absolute Codeword Object Set Sequence Number (ACN) of a Codeword Object Set is one greater than the ACN of the Codeword Object Set written immediately before it on tape, or is ZERO if the previously written 11-bit ACN is 2047. The ACN is included in Byte 1 (H1) and Byte 2 (H2). The ACN is the same in all CWI-4 headers in the Codeword Object Set. ACN is e.g., used for debugging, for failure analysis, etc. Also, all thirty-two ACN fields (11 bits) within a CWI-4 set are the same.

The CWI-4 Designation (CWID) field indicates the location of a CWI-4 within a data set, and is included in Byte 2 (H2) and Byte 3 (H3). The order of first-written CWIDs within a CWI-4 set are known during reading. Therefore, header interpolation during reading may be used to recover erroneous CWI-4 Designations.

According to one CWI-4 rewrite scheme, the order of re-written CWIDs within a CWI-4 set are not known during reading. Therefore, header interpolation cannot be used to decode CWI-4 Designations of rewritten CWI-4s. Also, the CWID fields (13 bits) within a CWI-4 set change, and therefore a header format that provides improved protection of all CWIDs would be beneficial to allow for placement of the decoded data within the CWI-4 set.

According to embodiments disclosed herein, since errors are detected in CWI-4s in the first write section which may be from one or more different CWI-4 sets, a rewritten CWI-4 set may include rewritten CWI-4s that were originally written in one or more different CWI-4 sets in the first write section.

In various tape formats, the size of the CWID may vary. For example, in some tape formats, the CWID may be 12-bits in length, in other formats it may be 13-bits in length. Of course, other lengths are also possible, and may be accounted for in the other structures and schemes described herein. For example, the size of the CWID is likely to increase in future generations of tape drives, and the embodiments described herein may be altered to account for this increased CWID size, including CWIDs having a size of 14 bits, 15 bits, and 16 bits in length, and more.

The Reserved Bits (RB) field is reserved for future use and expansion, and may be set to ZEROs (to reserve it for future use). The RB is included in Byte 4 (H4) and Byte 5 (H5). All RB fields (15 bits) within a CWI-4 set are the same. The Rewritten Flag (RF) is included in Byte 5 (H5) and is used to indicate whether the CWI-4 is rewritten or not, and may be set to ZERO for the first written instance of the CWI-4 in the data set. If the CWI-4 is rewritten for any reason, for example if an error is detected during read-while-write, this flag is set to ONE in each rewritten instance of the CWI-4. This flag is ignored on interchange, and all thirty-two RF fields (1 bit) within a CWI-4 set are the same.

The Write Pass Identifier (WPI) field, which is not shown in FIG. 3 may be included in 4 bytes (Bytes 6-9: H6, H7, H8 and H9). The WPI corresponds to the write pass on which the data set was written. The content of this field is the same as the Tape Write Pass value in the Data Set Information Table (DSIT) for the data set to which the CWI-4s belong, except following an interrupted data set. DSIT is a particular CWI-4 in a data set. The payload of the DSIT describes the content of the data set. All thirty-two WPI fields (32 bits) within a CWI-4 set, to be written, are the same.

However, all thirty-two WPI fields (32 bit) within a CWI-4 set are not necessarily the same during reading of the CWI-4 set from tape. This happens in response to errors occurring during the reading process, and in response to old data being read because of a defective writer or some other defect. When a WPI in a CWI-4 is different from those around it, it may be used to determine that a defective writer is attempting to write data to the tape, since data from a previous write pass will remain in a specific position on the tape corresponding to the defective writer.

The Header Parity field, also not shown in FIG. 3 is included in 2 bytes. The Header Parity field is generated using a RS code. The 2-byte header parity is used to detect errors that have occurred when the 12-byte headers are read.

Figure 4:
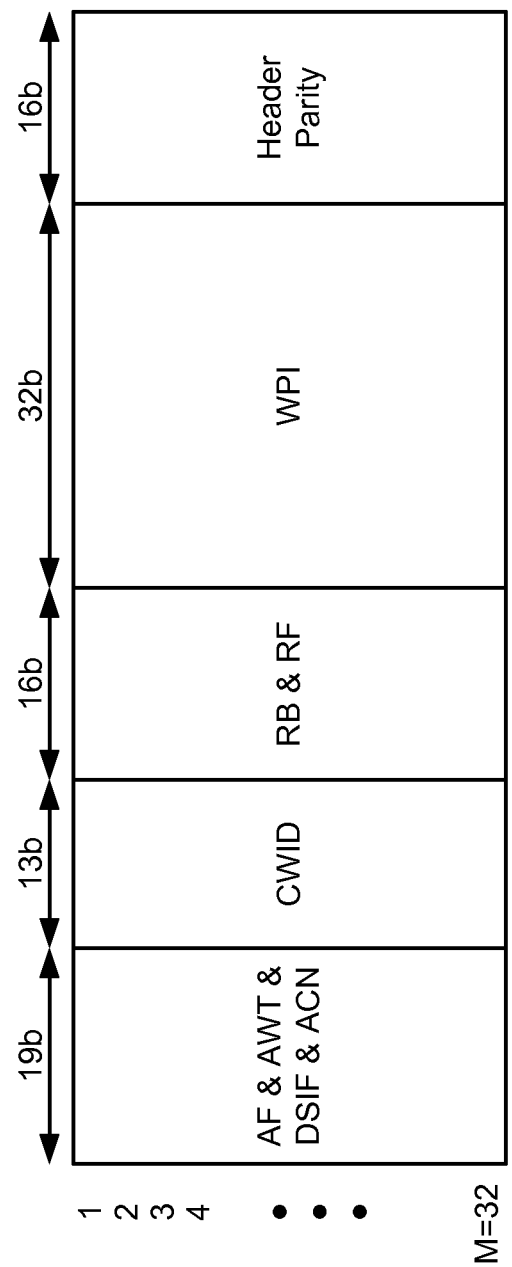
FIG. 4 shows a header format, according to one embodiment.

A header format that is used in some conventional tape formats is shown in FIG. 4. As shown, 32 headers are included in a CWI-4 set, indicated as M=32 rows. The CWID fields are 13 bits (b) in length and the header parity fields are 16 b in length, with each field being capable of storing unique data within a CWI-4 set, e.g., they are not the same for each M row. However, the CWID fields are known to the receiver, because the receiver knows the layout of the tape, when the data set is written for the first time.

The RB & RF fields are 16 b in length and are the same within a CWI-4 set. The RB fields are reserved for future use and the RF fields are ignored on interchange, typically. The WPI fields are 32 b in length and are the same within any given CWI-4 set. The WPI field is used to detect defective writers and avoid sending old data to SDRAM when a defective writer is detected. The AF & AWT & DSIF & ACN fields are 19 b in length and are the same within a CWI-4 set.

Figure 5A:
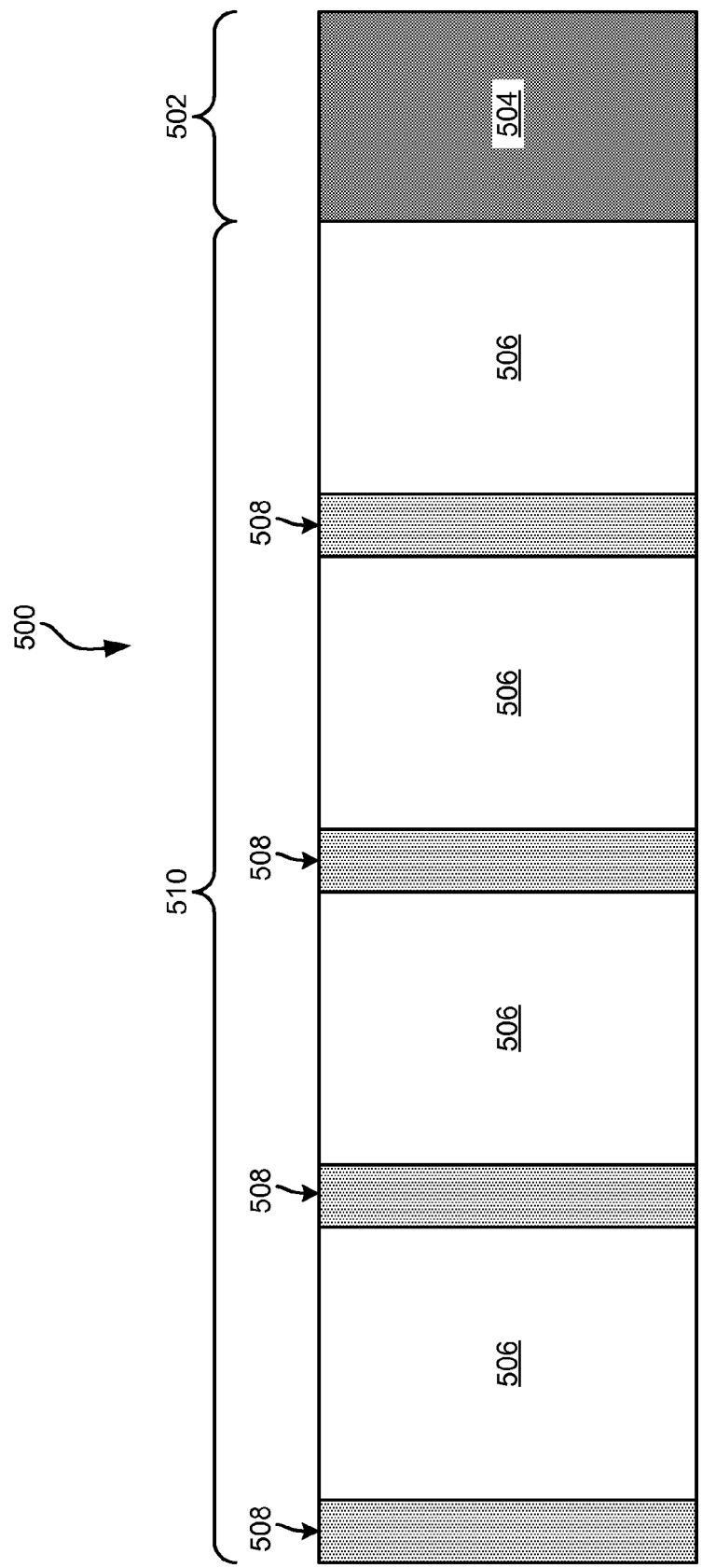
FIG. 5A shows variable-length headerized CWI-4 sets written to tape, according to one embodiment.

Now referring to FIG. 5A, variable-length headerized CWI-4 sets are shown in a data set 500 stored to tape according to one embodiment. As shown, in the first write section 510 of the tape, where the CWI-4s of a CWI-4 set are written to tape for the first time, some of the CWI-4s are written to tape using 4-byte headers 508 and some of the CWI-4s are written to tape using 0-byte headers 506 (e.g., written without headers). When 384 CWI-4 sets are included in a data set, 380 of the CWI-4 sets may be written as CWI-4s with 0-byte headers 506, while 4 of the CWI-4 sets may be written as CWI-4s with corresponding 4-byte headers 508. Each CWI-4 is written with a header, and therefore there is one header that corresponds to each CWI-4 that is written to the tape (unless the CWI-4 is written without a header, e.g., a 0-byte header).

In various other embodiments, the number of CWI-4 sets written as CWI-4s with corresponding 4-byte headers and CWI-4s with 0-byte headers may be changed to fit specific numbers and design parameters, such as a different number of CWI-4 sets (more or less than 384), a desire for more robust protection of data placement (which would increase the number of CWI-4 sets that are written as CWI-4s with the corresponding 4-byte headers), etc.

As shown in FIG. 5A, the CWI-4 sets written as CWI-4s with the 0-byte headers 506 and the CWI-4 sets written as CWI-4s with the 4-byte headers 508 may be distributed across the data set in columns, such that a first column has the CWI-4 sets written as CWI-4s with the 0-byte headers 506, 95 adjacent columns have the CWI-4 sets written as CWI-4s with the 4-byte headers 508, and then the pattern repeats itself. When more or less CWI-4 sets are written as CWI-4s with the 0-byte headers, the number of columns in between the columns having the CWI-4s with the 0-byte headers 506 may be adjusted to account for the number in the data set.

The tape may also reserve about 3% of the storage area thereof for rewriting data. In the rewrite section 502 of the tape, CWI-4 sets that are rewritten to the tape, due to errors being detected in the CWI-4s written to the first write section 510 of the tape, e.g., during read-while-write processing, may be written as CWI-4s with corresponding 12-byte rewrite headers 504, in order to provide robust protection for the placement of the data in these rewritten CWI-4 sets. In other embodiments, the CWI-4 sets that are rewritten to the rewrite section 502 of the tape may be written as CWI-4s with longer or shorter corresponding rewrite headers, such as 10-byte, 8-byte, 14-byte, 16-byte, etc.

FIG. 5B shows the 12-byte rewrite header for use in the rewrite section of the tape, and the 4-byte header for use in the first write section of the tape, according to one embodiment. These headers may be changed to accommodate various changes to how the CWI-4s of the CWI-4 sets are stored to tape, as would be understood to one of skill in the art upon reading the present descriptions.

Figure 6A:
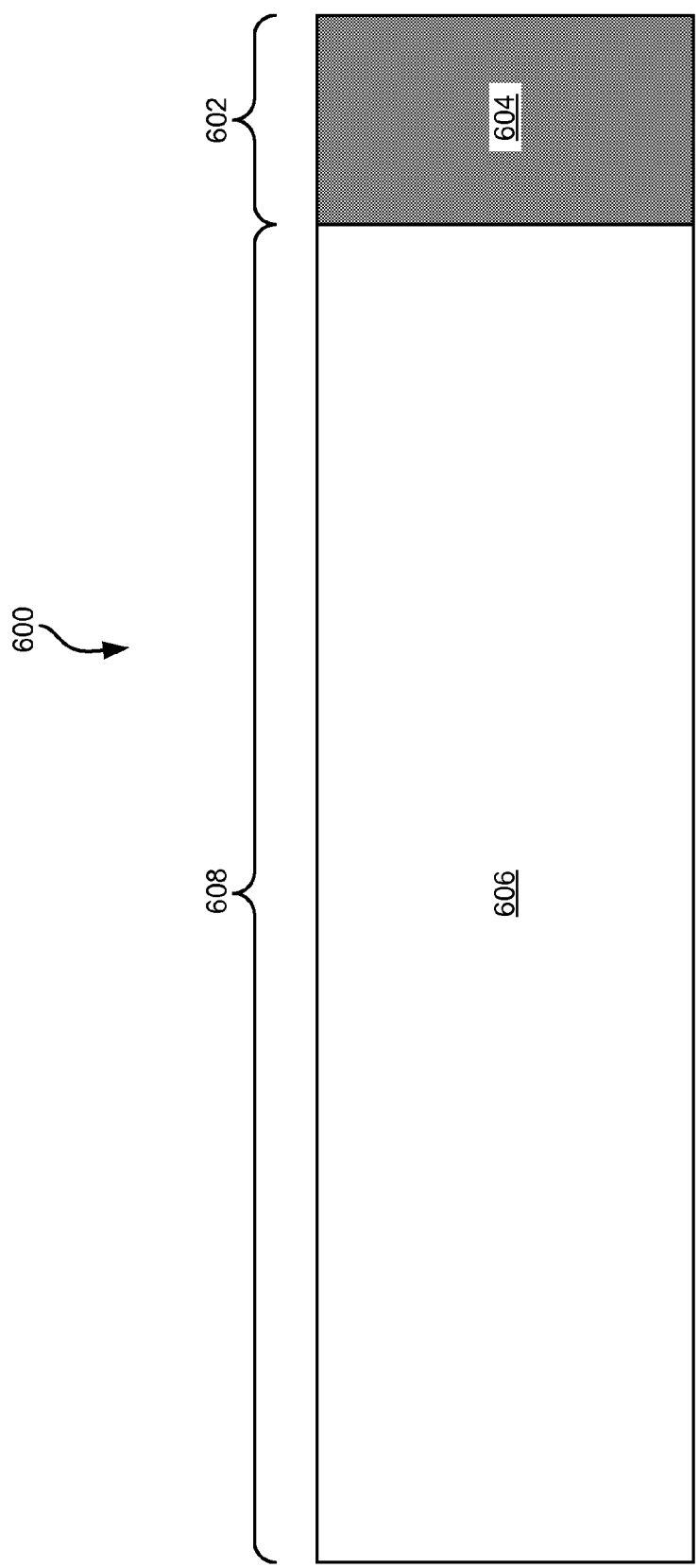
FIG. 6A shows variable-length headerized CWI-4 sets written to tape, according to one embodiment.

Now referring to FIG. 6A, variable-length headerized CWI-4 sets are shown in a data set 600 stored to tape according to one embodiment. As shown, in the first write section 608 of the tape, where the CWI-4 sets are written to tape for the first time, all of the CWI-4 sets are written to tape as CWI-4s with corresponding 4-byte headers 606. When 384 CWI-4 sets are included in a data set, all 384 of the CWI-4 sets may be written as M CWI-4s with M corresponding 4-byte headers 606. M may be any number of concurrently written CWI-4s that is possible using conventional magnetic write heads and magnetic media, as would be understood by one of skill in the art.

In various other embodiments, the size of each the headers of each the CWI-4s in the CWI-4 sets written may be changed to fit specific numbers and design parameters.

The tape may also reserve about 3% of the storage area thereof for rewriting data. In the rewrite section 602 of the tape, CWI-4 sets that are rewritten to the tape, due to errors being detected during read-while-write processing, may be written as CWI-4s with corresponding 12-byte rewrite headers 604, in order to provide robust protection for the placement of the data in these rewritten CWI-4 sets. In other embodiments, the CWI-4 sets that are rewritten to the rewrite section 602 of the tape may be written as CWI-4s with longer or shorter corresponding rewrite headers, such as 10-byte, 8-byte, 14-byte, 16-byte, etc.

FIG. 6B shows the 12-byte rewrite header for use in the rewrite section of the tape, and the 4-byte header for use in the first write section of the tape, according to one embodiment. These headers may be changed to accommodate various changes to how the CWI-4 sets are stored to tape, as would be understood to one of skill in the art upon reading the present descriptions.

Figure 7A:
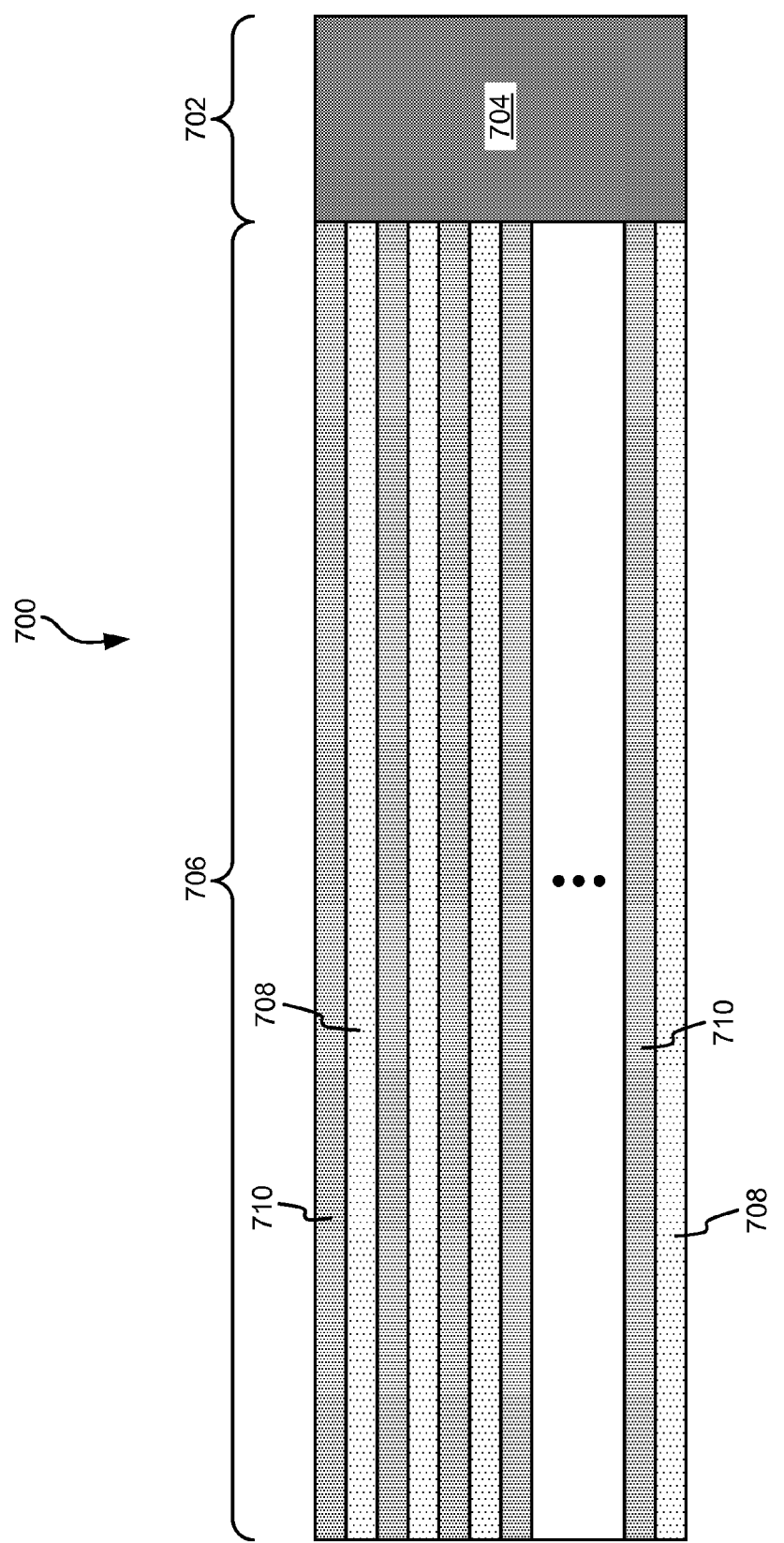
FIG. 7A shows variable-length headerized CWI-4 sets written to tape, according to one embodiment.

Now referring to FIG. 7A, variable-length headerized CWI-4 sets are shown in a data set 700 stored to tape according to one embodiment. As shown, in the first write section 706 of the tape, where the CWI-4 sets are written to tape for the first time, some of the CWI-4 sets are written to tape as CWI-4s having corresponding first headers that include a first 4-bytes of one of a plurality of 8-byte headers 708 and some of the CWI-4 sets are written to tape as CWI-4s having corresponding second headers that include a second 4-bytes of one of the plurality of 8-byte headers 710. In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s.

In this or any other embodiment, P may be at least one of: modulo 8, and an integer multiple of M.

In another embodiment, only the first headers (or only the second headers in an alternate embodiment) include the CWID, which indicates the SDS number and the row number of the SDS where the particular CWI-4 is located after being stored. The second headers (or the first headers in the alternate embodiment) do not contain the CWIDs for that particular CWI-4.

When 384 CWI-4 sets are included in a data set, half (192) of the CWI-4 sets may be written as CWI-4s having corresponding first headers that include the first 4-bytes of one of the plurality of 8-byte headers 708 and half (192) of the CWI-4 sets may be written as CWI-4s having corresponding second headers that include the second 4-bytes of one of the plurality of 8-byte headers 710.

In various other embodiments, the size of the header may be increased or decreased, such that the first headers and second headers are evenly distributed across the rows of the data set, when using 4-byte headers, 6-byte headers, 10-byte headers, 12-byte headers, etc.

As shown in FIG. 7A, 8-byte headers may be used, with the CWI-4 sets being written as CWI-4s having corresponding first headers that include the first 4-bytes of one of a plurality of headers 710 in a first row, and then the CWI-4 sets being written as CWI-4s having corresponding second headers that include the second 4-bytes of one of the plurality of headers 708 in a second row, with the pattern repeating for an entirety of the data set. This results in each CWI-4 set being written as CWI-4s having corresponding 4-byte portions of one of the 8-byte headers in the first write section 706.

The tape may also reserve about 3% of the storage area thereof for rewriting data. In the rewrite section 702 of the tape, CWI-4 sets that are rewritten to the tape, due to errors being detected during read-while-write processing, may be written as CWI-4s with corresponding 12-byte rewrite headers 704, in order to provide robust protection for the placement of the data in these rewritten CWI-4 sets. In other embodiments, the CWI-4 sets that are rewritten to the rewrite section 702 of the tape may be written as CWI-4s with longer or shorter corresponding rewrite headers, such as 10-byte, 8-byte, 14-byte, 16-byte, etc.

FIG. 7B shows the 12-byte rewrite header for use in the rewrite section of the tape, and the 8-byte header for use in the first write section of the tape, which may be split into two 4-byte sections (the upper section being the first 4-bytes of the header, and the lower section being the second 4-bytes of the header), according to one embodiment. These headers may be changed to accommodate various changes to how the CWI-4 sets are stored to tape, as would be understood to one of skill in the art upon reading the present descriptions.

Figure 8A:
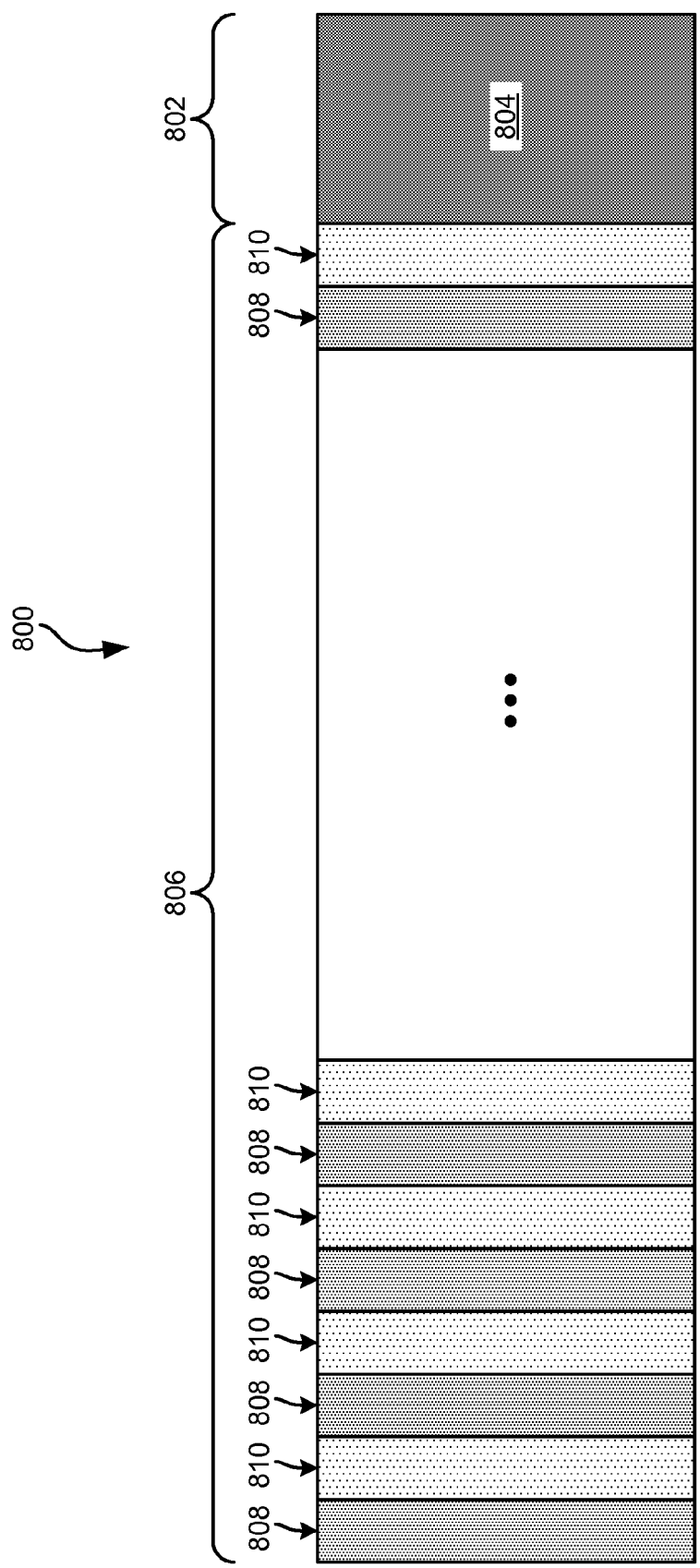
FIG. 8A shows variable-length headerized CWI-4 sets written to tape, according to one embodiment.

Now referring to FIG. 8A, variable-length headerized CWI-4 sets are shown in a data set 800 stored to tape according to one embodiment. As shown, in the first write section 806 of the tape, where the CWI-4 sets are written to tape for the first time, some of the CWI-4 sets are written to tape using a first 4-bytes of one of a plurality of 8-byte headers 808 and some of the CWI-4 sets are written to tape using a second 4-bytes of one of the plurality of 8-byte headers 810, with each 8-byte header being split across a first and second header. When 384 CWI-4 sets are included in a data set, half (192) of the CWI-4 sets may be written with the first 4-bytes of one of the plurality of 8-byte headers 808 and half (192) of the CWI-4 sets may be written with the second 4-bytes of one of the plurality of 8-byte headers 810. In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s.

In this or any other embodiment, P may be at least one of: modulo 8, and an integer multiple of M.

In various other embodiments, the size of the header may be increased or decreased, such that the first and second portions of the headers are evenly distributed across the rows of the data set, when using 4-byte headers, 6-byte headers, 10-byte headers, 12-byte headers, etc.

As shown in FIG. 8A, 8-byte headers may be used, with CWI-4 sets being written with the first 4-bytes of one of the 8-byte headers 810 in a first column, and then CWI-4 sets being written with the second 4-bytes of one of the 8-byte headers 808 in a second column, with the pattern repeating for an entirety of the data set. Moreover, each of the 8-byte headers is split across a first and second header. This results in each CWI-4 set being written with a 4-byte header in the first write section 806.

The tape may also reserve about 3% of the storage area thereof for rewriting data. In the rewrite section 802 of the tape, CWI-4 sets that are rewritten to the tape, due to errors being detected during read-while-write processing, may include 12-byte rewrite headers 804, in order to provide robust protection for the placement of the data in these rewritten CWI-4 sets. In other embodiments, the CWI-4 sets that are rewritten to the rewrite section 802 of the tape may have longer or shorter headers, such as 10-byte, 8-byte, 14-byte, 16-byte, etc.

FIG. 8B shows the 12-byte rewrite header for use in the rewrite section of the tape, and the 8-byte header for use in the first write section of the tape, which may be split into two 4-byte sections (the upper section being the first 4-bytes of one of the 8-byte headers, and the lower section being the second 4-bytes of one of the 8-byte headers), according to one embodiment. These headers may be changed to accommodate various changes to how the CWI-4 sets are stored to tape, as would be understood to one of skill in the art upon reading the present descriptions.

Figure 9A:
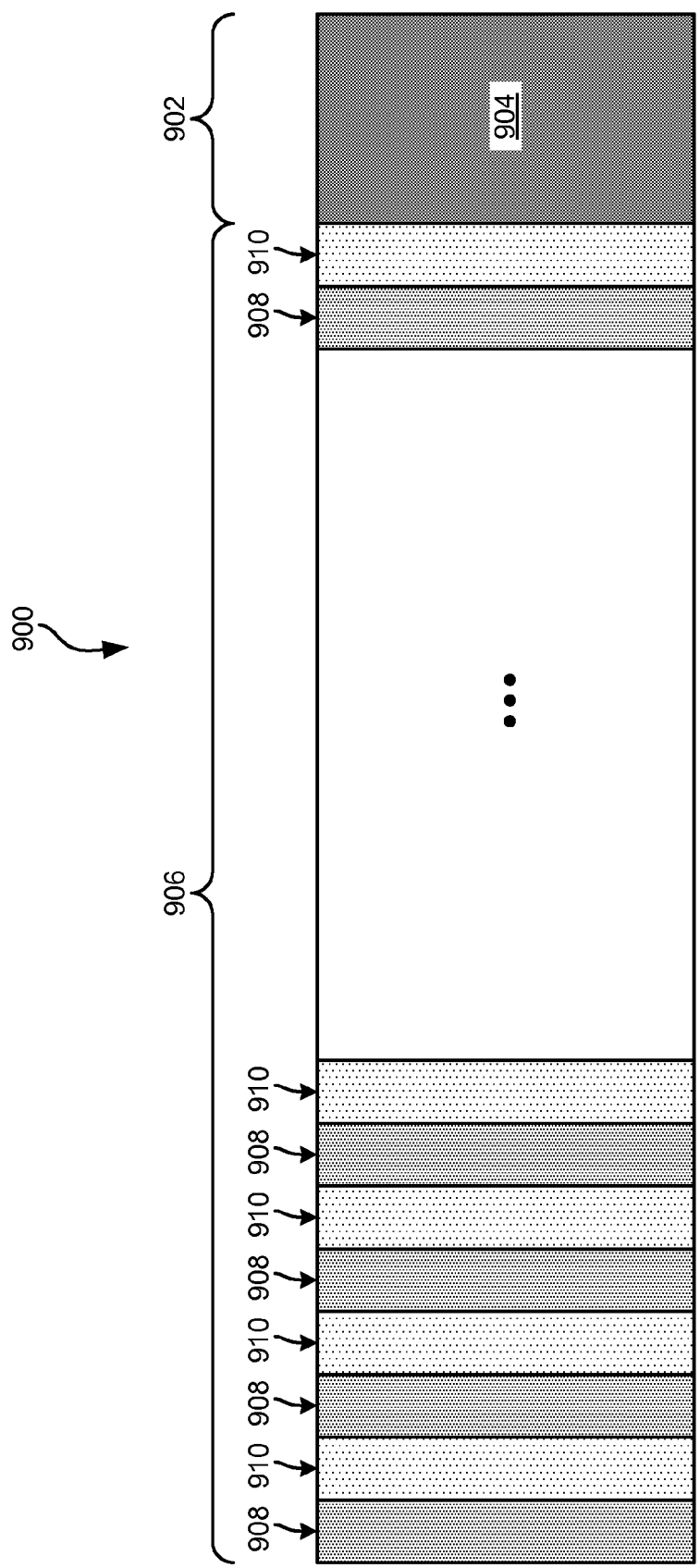
FIG. 9A shows variable-length headerized CWI-4 sets written to tape, according to one embodiment.

Now referring to FIG. 9A, variable-length headerized CWI-4 sets are shown in a data set 900 stored to tape according to one embodiment. As shown, in the first write section 906 of the tape, where the CWI-4 sets are written to tape for the first time, some of the CWI-4 sets are written to tape as CWI-4s with corresponding 4-byte headers 908 and some of the CWI-4 sets are written to tape as CWI-4s with corresponding 0-byte headers 910 (e.g., no headers). When 384 CWI-4 sets are included in a data set, half (192) of the CWI-4 sets may be written as CWI-4s with the corresponding 4-byte headers 908 and half (192) of the CWI-4 sets may be written as CWI-4s with the corresponding 0-byte headers 910. This may be referred to as an interleaved variable-length headerized CWI-4 set structure.

In various other embodiments, the number of CWI-4 sets written as CWI-4s with corresponding 4-byte headers and as CWI-4s with corresponding 0-byte headers may be changed to fit specific numbers and design parameters, such as a different number of CWI-4 sets (more or less than 384), a desire for more robust protection of data placement (which would increase the number of CWI-4 sets that are written as CWI-4s with corresponding 4-byte headers), etc.

As shown in FIG. 9A, the CWI-4 sets are written as CWI-4s with the corresponding 4-byte headers 908 in a first column, and then CWI-4 sets are written as CWI-4s with the corresponding 0-byte headers 910 in a second column, with the pattern repeating for an entirety of the data set. In this way, even numbered CWI-4 sets are written as CWI-4s with the corresponding 4-byte headers 908 and odd numbered CWI-4 sets are written as CWI-4s with the corresponding 0-byte headers 910.

The tape may also reserve about 3% of the storage area thereof for rewriting data. In the rewrite section 902 of the tape, CWI-4 sets that are rewritten to the tape, due to errors being detected during read-while-write processing, may include 12-byte rewrite headers 904, in order to provide robust protection for the placement of the data in these rewritten CWI-4 sets. In other embodiments, the CWI-4 sets that are rewritten to the rewrite section 902 of the tape may be written as CWI-4s with longer or shorter corresponding rewrite headers, such as 10-byte, 8-byte, 14-byte, 16-byte, etc.

FIG. 9B shows the 12-byte rewrite header for use in the rewrite section of the tape, and the 4-byte header for use in the first write section of the tape for even numbered CWI-4 sets, according to one embodiment (the 0-byte header is not shown because it does not include any information). These headers may be changed to accommodate various changes to how the CWI-4 sets are stored to tape, as would be understood to one of skill in the art upon reading the present descriptions.

Figure 10A:
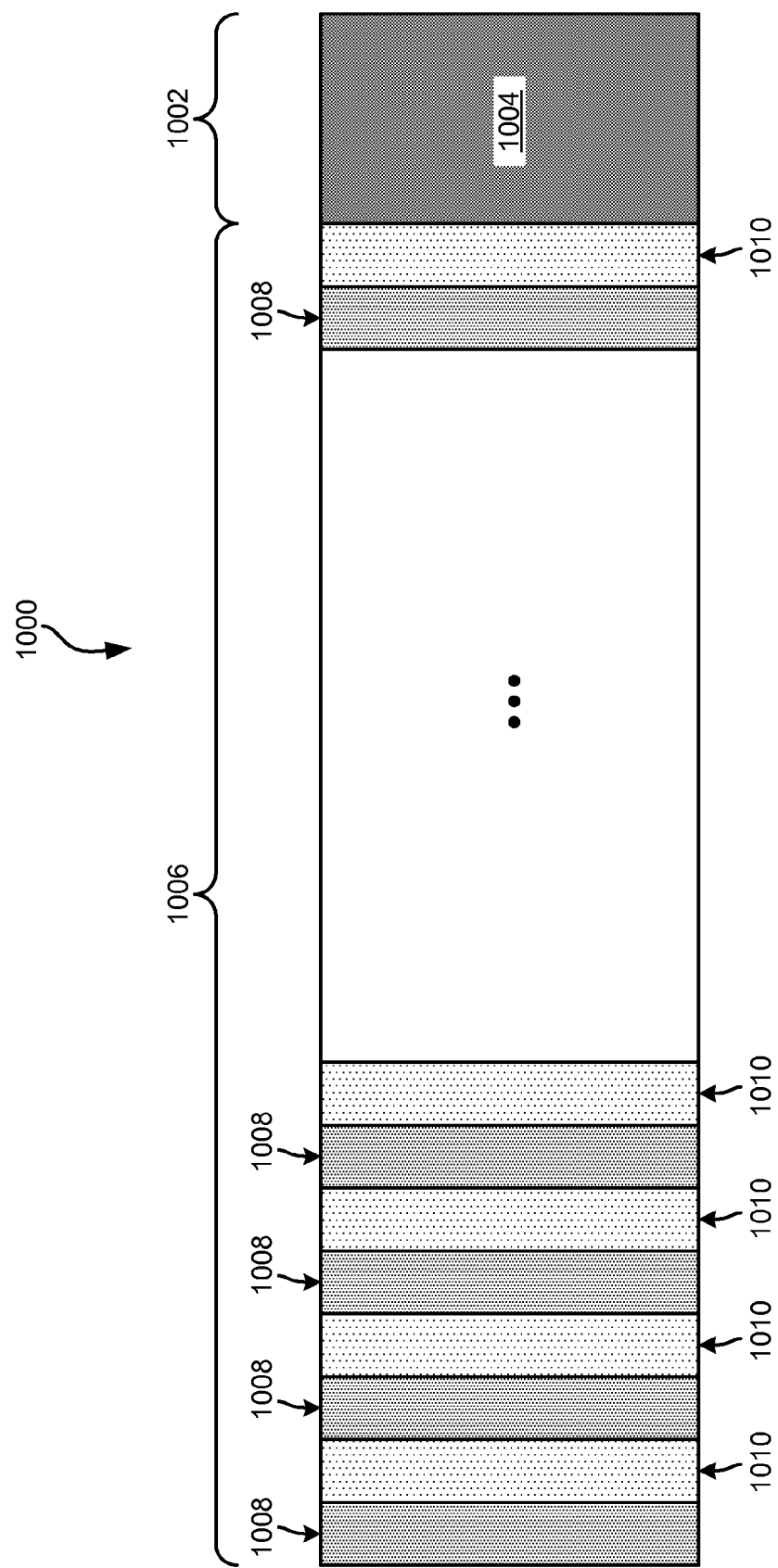
FIG. 10A shows variable-length headerized CWI-4 sets written to tape, according to one embodiment.

Now referring to FIG. 10A, variable-length headerized CWI-4 sets are shown in a data set 1000 stored to tape according to one embodiment. As shown, in the first write section 1006 of the tape, where the CWI-4 sets are written to tape for the first time, some of the CWI-4 sets are written to tape as CWI-4s with corresponding 8-byte headers 1008 and some of the CWI-4 sets are written to tape as CWI-4s with corresponding 0-byte headers 1010 (e.g., no header). When 384 CWI-4 sets are included in a data set, half (1102) of the CWI-4 sets may be written as CWI-4s with the corresponding 8-byte headers 1008 and half (1102) of the CWI-4 sets may be written as CWI-4s with the corresponding 0-byte headers 1010. This may be referred to as an interleaved variable-length headerized CWI-4 set structure.

In various other embodiments, the number of CWI-4 sets written as CWI-4s with the corresponding 8-byte headers and with the corresponding 0-byte headers may be changed to fit specific numbers and design parameters, such as a different number of CWI-4 sets (more or less than 384), a desire for more robust protection of data placement (which would increase the number of CWI-4 sets that are written as CWI-4s with the 8-byte headers), etc.

As shown in FIG. 10A, the CWI-4 sets are written as CWI-4s with the corresponding 8-byte headers 1008 in a first column, and then CWI-4 sets are written as CWI-4s with the corresponding 0-byte headers 1010 in a second column, with the pattern repeating for an entirety of the data set. In this way, even numbered CWI-4 sets are written as CWI-4s with the 8-byte headers 1008 and odd numbered CWI-4 sets are written as CWI-4s with the 0-byte headers 1010.

The tape may also reserve about 3% of the storage area thereof for rewriting data. In the rewrite section 1002 of the tape, CWI-4 sets that are rewritten to the tape, due to errors being detected during read-while-write processing, may be written as CWI-4s having corresponding 12-byte rewrite headers 1004, in order to provide robust protection for the placement of the data in these rewritten CWI-4 sets. In other embodiments, the CWI-4 sets that are rewritten to the rewrite section 1002 of the tape may be written as CWI-4s that have longer or shorter rewrite headers, such as 10-byte, 8-byte, 14-byte, 16-byte, etc.

FIG. 10B shows the 12-byte rewrite header for use in the rewrite section of the tape, and the 8-byte header for use in the first write section of the tape for even numbered CWI-4 sets, according to one embodiment (the 0-byte header is not shown because it does not include any information). These headers may be changed to accommodate various changes to how the CWI-4 sets are stored to tape, as would be understood to one of skill in the art upon reading the present descriptions.

Each header for CWI-4s in the first write and the rewrite sections of each of the embodiments described in FIGS. 5A-10B may be different, and that when referred to as "first headers" and "rewrite headers," it is intended to refer to all the headers for all of the CWI-4s for each write section together as a group, and not indicate that they are all the same headers having the exact same bits stored therein (particularly, the bits in the CWID and parity fields of the headers may be different for each CWI-4 written, whether in the first write section or the rewrite section).

Moreover, although in embodiments described herein, CWI-4s within a CWI-4 set all have equal length in bytes (for practical implementation reasons this is desirable), CWI-4s from different CWI-4 sets may have different lengths in bytes because the headers may have different lengths in bytes.

An amount of space increased by using the various header structures described above may be determined, with the following defined variables: M=number of channels (M=16 in LTO-5 and LTO-6, M=32 in 32-channel enterprise tape drives); L=number of sub data sets per data set (L=32 in 16-channel drives, L=64 in 32-channel enterprise tape drives); J=number of C1 codewords in a sub data set row (J=4 in LTO-5, LTO-6, and 32-channel enterprise tape drives); C1 code is a (N1, K1) RS code with K1 information bytes and N1-K1 parity bytes; C2 code is a (N2, K2) RS code with K2 information bytes and N2-K2 parity bytes. With these variables, the increase in cartridge capacity for the header structures described in FIGS. 5A-10B when compared to sub data sets with fixed 12-byte header size may be calculated with Equations 1-3, with Equation 1 calculating the increase in cartridge capacity (G1) for the header structure in FIGS. 5A-5B, Equation 2 calculating the increase in cartridge capacity (G2, G3, G4, G6) for the header structures in FIGS. 6A-8B and 10A-10B, and Equation 3 calculating the increase in cartridge capacity (G5) for the header structure in FIGS. 9A-9B.

$$G1=(12*(N2*L/M-4)/(N2*L/M)+8*4/(N2*L/M))/(J*K1) \quad \text{Equation 1}$$

$$G2=G3=G4=G6=8/(J*K1) \quad \text{Equation 2}$$

$$G5=10/(J*K1) \quad \text{Equation 3}$$

The maximum possible increase in cartridge capacity that may be obtained by completely eliminating headers is equal to 12/(J*K1). In the header structures shown in FIGS. 6A-8B, header sizes are space-varying. This is due to the headers being of different sizes during the first write and rewrite. During the first write of the data set, the headers are 4 bytes long, whereas during the rewrite they are 12 bytes long (or less in some embodiments).

In the header structures shown in FIGS. 6A-10B, operation in the presence of interrupted data sets is possible due to the header structures employed. The writing of a data set may be interrupted, such as due to a defect or disturbance that may result in incorrectly written tracks. When writing is interrupted, any data set for which all the synchronized codeword object (SCO) sets have not been successfully recorded and subsequently verified are considered to be an interrupted data set.

A system for writing data using variable-length headers may utilize any of the header structures described in FIGS. 5A-10B, in various embodiments. One such system may include a processor and logic integrated with and/or executable by the processor. The processor may be of a type known in the art, or a specialized processor specific to storing data using variable-length headerized CWI-4 sets. The logic may be configured to perform a first write of a data set to a first write section of a magnetic medium with first headers, a CWI-4 set comprising a fixed number of M concurrently written CWI-4s having M corresponding first headers, and perform a rewrite of at least some of the data set as rewritten CWI-4 sets to a rewrite section of the magnetic medium as M rewritten CWI-4s having M corresponding rewrite headers. The magnetic medium may be a magnetic tape, an optical disk, etc.

The data set comprises a plurality of sub data sets, each sub data set comprising a data array organized in rows and columns, with each row of the data array comprising four interleaved C1 codewords (a CWI-4). A first portion of the data set, comprising a predetermined number of CWI-4 sets, is stored as CWI-4s to the first write section of the magnetic medium having corresponding first headers, and each rewritten CWI-4 set is stored to the rewrite section of the magnetic medium as CWI-4s having corresponding rewrite headers. The rewritten CWI-4 sets are determined (a number of CWI-4s are chosen to be rewritten after being stored a first time in the first write section of the magnetic medium) based on errors being detected in the CWI-4s stored in the first write section of the magnetic medium. Also, a length of the rewrite header is always greater than a length of the first header.

In one embodiment, the data set may include 384 CWI-4 sets, as described previously. In other embodiments, more or less CWI-4 sets may be included in each data set.

In an embodiment, the logic may be further configured to detect the errors in the CWI-4s stored in the first write section of the magnetic medium using a read-while-write process. The read-while-write process is configured to read data from the magnetic medium after it has been written to the magnetic medium in order to determine whether any errors are detected. In response to such errors being detected, a determination is made as to whether the number of errors would cause a read of the data to fail (e.g., too many errors for the error correction code to overcome). When this is the case, this CWI-4 will be marked for rewriting into the rewrite section of the magnetic medium, and when enough CWI-4s are determined to need to be rewritten, a CWI-4 set may be compiled from these CWI-4s that need to be rewritten.

In one embodiment, a remaining portion of the data set that is stored as CWI-4 sets to the first write section of the magnetic medium are stored as CWI-4s with corresponding second headers. A length of each of the second headers may be equal to the length of each of the first headers (with both headers being 4 bytes in length in one embodiment). When this is the case, each of the first headers may include a first 4 bytes of one of a plurality of 8-byte common headers, each of the second headers may include a second 4 bytes of the 8-byte common header, half of the CWI-4 sets of the data set may be stored as CWI-4s with the first headers in the first write section of the magnetic medium, and half of the CWI-4 sets of the data set may be stored as CWI-4s with the second headers in the first write section of the magnetic medium, as described in several embodiments in FIGS. 7A-8B. Moreover, with each common header is split across a first and second header.

In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s, each CWI-4 being written with either a first or second header.

In this or any other embodiment, P may be at least one of: modulo 8, and an integer multiple of M.

According to another embodiment, each of the first headers may be 4 bytes in length, and all CWI-4 sets may be stored to the first write section of the magnetic medium as CWI-4s with the corresponding first headers, as described in FIGS. 6A-6B. In this way, the variable length nature of the headerized CWI-4 sets comes into play when data is rewritten to the rewrite section of the magnetic medium, which will have a rewrite header that is longer than the first header.

In more approaches, a remaining portion of the data set that is stored as CWI-4 sets to the first write section of the magnetic medium may be stored as CWI-4s without any headers. In one such embodiment, each of the first headers may be 4 bytes in length, odd numbered CWI-4 sets may be stored to the first write section of the magnetic medium as CWI-4s without any headers, even numbered CWI-4 sets may be stored to the first write section of the magnetic medium as CWI-4s with the first headers, and the CWI-4 sets stored as CWI-4s without any headers may be interleaved with the CWI-4 sets stored as CWI-4s with the first headers, as described in FIGS. 9A-9B.

In an alternate embodiment, each of the first headers may be 8 bytes in length, odd numbered CWI-4 sets may be stored to the first write section of the magnetic medium as CWI-4s without any headers, even numbered CWI-4 sets may be stored to the first write section of the magnetic medium as CWI-4s with the first headers, and the CWI-4 sets stored as CWI-4s without any headers may be interleaved with the CWI-4 sets stored as CWI-4s with the first headers, as described in FIGS. 10A-10B.

According to another alternate embodiment, each of the first headers may be 8 bytes in length, 380 CWI-4 sets may be stored to the first write section of the magnetic medium as CWI-4s without any headers, and 4 CWI-4 sets may be stored to the first write section of the magnetic medium as CWI-4s with the first headers, as described in FIGS. 5A-5B.

In any of these embodiments, each of the rewrite headers may be 12 bytes in length, or more or less, and the magnetic medium may be a magnetic tape housed in a tape cartridge operable in a tape drive.

One such tape drive may comprise a processor and logic integrated with and/or executable by the processor. The logic is configured to perform a first write of a data set to a first write section of a magnetic tape, the data set comprising a plurality of sub data sets, each sub data set comprising a data array organized in rows and columns, each row of the data array comprising four interleaved C1 codewords (a CWI-4 set), wherein a first portion of the data set is stored as CWI-4 sets to the first write section of the magnetic tape with a first header, detect errors in the CWI-4 sets stored in the first write section of the magnetic tape using a read-while-write process, and perform a rewrite of at least some of the data set as rewritten CWI-4 sets to a rewrite section of the magnetic tape based on the errors detected. Each rewritten CWI-4 set is stored to the rewrite section of the magnetic tape with a rewrite header, the rewrite header is 12 bytes in length, a length of the first header is less than 12 bytes, and the data set comprises 384 CWI-4 sets.

Table 1, below, shows a summary of the added tape cartridge capacity that is possible using the various header structures described herein in several embodiments. For the calculations in Table 1, it is assumed that the C1 code is: (N1=240, K1=228) RS code, the C2 code is: (N2=192, K2=168) RS code, and there are 384 CWI-4 sets per data set.

TABLE 1

| FIGS. | Header | Header Structure | | # of CWI-4 sets | Added Capacity for a 20 TB cartridge | Added Cartridge Capacity (%) |
|---|---|---|---|---|---|---|
| 5A-5B | 0-byte | — | | 380 | 262 GB | G1 = 1.311% |
|  | 4-byte | 4-bytes | | 4 | | |
| 6A-6B | 4-byte | 4-bytes | Short AWT/ WPI | 384 | 175 GB | G2 = 0.877% |
| 7A-7B | 4-byte | 8-bytes | | 384 | 175 GB | G3 = 0.877% |
| 8A-8B | 4-byte | 8-bytes | | 384 | 175 GB | G4 = 0.877% |
| 9A-9B | 0-byte | — | Short AWT/ WPI | 192 | 220 GB | G5 = 1.096% |
|  | 4-byte | 4-bytes | | 192 | | |
| 10A-10B | 0-byte | — | | 192 | 175 GB | G6 = 0.877% |
|  | 8-byte | 8-bytes | | 192 | | |

Figure 11:
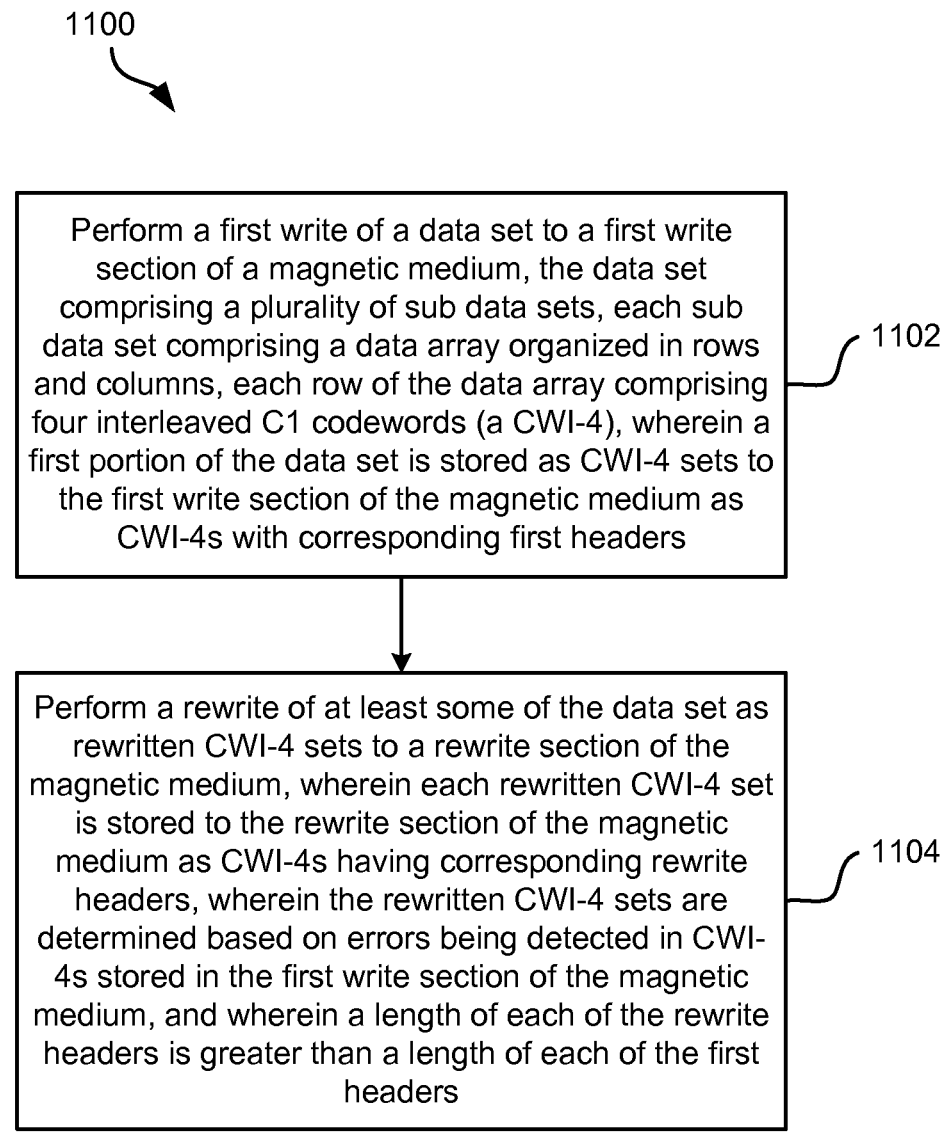
FIG. 11 is a flowchart of a method according to one embodiment.

Now referring to FIG. 11, a flowchart of a method 1100 for writing data using variable-length headers is shown according to one embodiment. The method 1100 may be executed in and/or with the use of any of the environments, systems, apparatuses, and/or schemes described in FIGS. 1-10B, in various approaches. Furthermore, the method 1100 may include more or less operations than those specifically described with reference to FIG. 11.

In operation 1102, a first write is performed of a data set to a first write section of a magnetic medium, such as a magnetic tape. The data set includes a plurality of sub data sets, each sub data set comprising a data array organized in rows and columns, with each row of the data array comprising four interleaved C1 codewords (a CWI-4). A first portion of the data set may be stored as CWI-4 sets to the first write section of the magnetic medium as CWI-4s with corresponding first headers.

In operation 1104, at least some of the data is selected for rewrite based on errors detected in the data in the first write section. The selected data may be rewritten as CWI-4 sets to a rewrite section of the magnetic medium. Each rewritten CWI-4 set may be stored to the rewrite section of the magnetic medium as CWI-4s having corresponding rewrite headers. The rewritten CWI-4 sets are determined based on errors being detected in CWI-4s stored in the first write section of the magnetic medium, and a length of each of the rewrite headers is greater than a length of each of the first headers.

Method 1100 may further include detecting the errors in the CWI-4s stored in the first write section of the magnetic medium using a read-while-write process, as described in more detail previously.

Method 1100 may also include storing a remaining portion of the data set that is stored as CWI-4 sets to the first write section of the magnetic medium as CWI-4s in association with corresponding second headers. A length of each of the second headers may be equal to the length of each of the first headers in this approach, each of the first headers may include a first 4 bytes of one of a plurality of common 8-byte headers, each of the second headers may include a second 4 bytes of the common 8-byte header, with each common header being split across a first and second header, half of the CWI-4 sets of the data set may be stored as CWI-4s with the first headers in the first write section of the magnetic medium, and half of the CWI-4 sets of the data set may be stored as CWI-4s with the second headers in the first write section of the magnetic medium.

In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s, each CWI-4 being written with either a first or second header.

In this or any other embodiment, P may be at least one of: modulo 8, and an integer multiple of M.

In another approach, each of the first headers may be 4 bytes in length, and in this embodiment, all CWI-4 sets may be stored to the first write section of the magnetic medium as CWI-4s with their corresponding first headers.

According more embodiments, a remaining portion of the data set that is stored as CWI-4 sets to the first write section of the magnetic medium may be stored as CWI-4s without any headers of any kind.

In one such embodiment, each of the first headers may be 4 bytes in length, odd numbered CWI-4 sets may be stored to the first write section of the magnetic medium as CWI-4s without any headers, even numbered CWI-4 sets may be stored to the first write section of the magnetic medium as CWI-4s with their corresponding first headers, and the CWI-4 sets stored as CWI-4s without any headers may be interleaved with the CWI-4 sets stored as CWI-4s with their corresponding first headers.

In another such embodiment, each of the first headers may be 8 bytes in length, odd numbered CWI-4 sets may be stored to the first write section of the magnetic medium as CWI-4s without any headers, even numbered CWI-4 sets may be stored to the first write section of the magnetic medium as CWI-4s with their corresponding first headers, and the CWI-4 sets stored as CWI-4s without any headers may be interleaved with the CWI-4 sets stored as CWI-4s with their corresponding first headers.

According to yet another such embodiment, each of the first headers may be 8 bytes in length, 380 CWI-4 sets may be stored to the first write section of the magnetic medium as CWI-4s without any headers, and 4 CWI-4 sets may be stored to the first write section of the magnetic medium as CWI-4s with their corresponding first headers.

In any of these embodiments, each of the rewrite headers may be 12 bytes in length or more or less, and the magnetic medium may be a magnetic tape housed in a tape cartridge operable in a tape drive.

Figure 12:
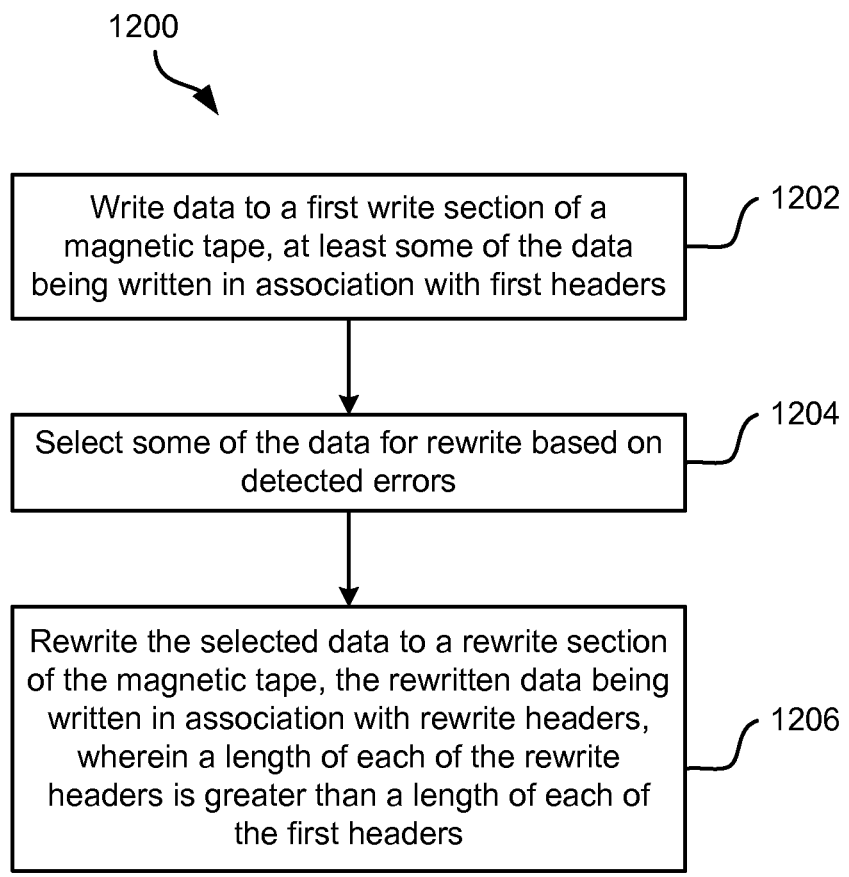
FIG. 12 is a flowchart of a method according to one embodiment.

Now referring to FIG. 12, a flowchart of a method 1200 for writing data using variable-length headers is shown according to one embodiment. The method 1200 may be executed in and/or with the use of any of the environments, systems, apparatuses, and/or schemes described in FIGS. 1-10B, in various approaches. Furthermore, the method 1200 may include more or less operations than those specifically described with reference to FIG. 12.

In operation 1202, data is written to a first write section of a magnetic tape, at least some of the data being written in association with first headers. The first headers may have any length known in the art, such as 2 bytes, 4 bytes, 6 bytes, 8 bytes, etc.

In operation 1204, some of the data is selected for rewrite based on detected errors. The errors may be detected using any method known in the art, such as a read-while-write process as described herein in more detail. Furthermore, problems in a system used to write the data may also prompt data to be selected for rewriting, as would be understood by one of skill in the art.

In operation 1206, the selected data is rewritten to a rewrite section of the magnetic tape, the rewritten data being written in association with rewrite headers. A length of each of the rewrite headers (which in one embodiment all have the same length) is greater than a length of each of the first headers (which in one embodiment all have the same length). Furthermore, when used, the length of each of the rewrite headers may also be greater than a length of second headers used to write data to the first write section of the magnetic tape, as described later.

Method 1200 may further include detecting the errors in the data written in the first write section of the magnetic tape using a read-while-write process, as described in more detail previously.

In one embodiment, the data may include at least one data set, the at least one data set comprising a plurality of sub data sets, each sub data set comprising a data array organized in rows and columns, with each row of the data array comprising four interleaved C1 codewords (a CWI-4). The data is stored as a plurality of CWI-4 sets, each CWI-4 set comprising a fixed number of CWI-4s, with the length of each of the first headers being less than 12 bytes, and the length of each of the rewrite headers being at least 12 bytes.

Furthermore, method 1200 may further include writing a remaining portion of the data (that was not written in association with the first headers) to the first write section of the magnetic tape without any headers. In this approach, the first header may be either 4 bytes or 8 bytes in length, odd numbered CWI-4 sets are stored to the first write section of the magnetic tape as CWI-4s without any headers, even numbered CWI-4 sets are stored to the first write section of the magnetic tape as CWI-4s in association with the first headers, and the CWI-4 sets written as CWI-4s without any headers are interleaved with the CWI-4 sets written as CWI-4s in association with the first headers.

In another embodiment, each of the first headers may be 4 bytes or 8 bytes in length, 380 CWI-4 sets may be written to the first write section of the magnetic tape as CWI-4s without any headers, and 4 CWI-4 sets may be written to the first write section of the magnetic tape as CWI-4s in association with their corresponding first headers.

According to one embodiment, method 1200 may include writing a remaining portion of the data to the first write section of the magnetic tape, that is not written as CWI-4s in association with their corresponding first headers, as CWI-4s in association with corresponding second headers. A length of each of the second headers may be equal to the length of each of the first headers, each of the first headers may comprise a first half of a common header, each of the second headers may comprise a second half of the common header, half of the data may be written as CWI-4s associated with the first headers in the first write section of the magnetic tape, and another half of the data may be written as CWI-4s associated with the second headers in the first write section of the magnetic tape.

For example, the remaining portion of the data may be stored as CWI-4 sets to the first write section of the magnetic tape as CWI-4s in association with the second headers, a length of each of the second headers being equal to the length of each of the first headers in this approach. Also, each of the first headers may include a first 4 bytes of an 8-byte header, each of the second headers may include a second 4 bytes of the 8-byte header, half of the CWI-4 sets of the data may be stored as CWI-4s in association with the first headers in the first write section of the magnetic tape, and half of the CWI-4 sets of the data may be stored as CWI-4s in association with the second headers in the first write section of the magnetic medium.

In one particular embodiment, each of the first headers may be 4 bytes in length, all of the data is stored to the first write section of the magnetic tape as CWI-4s in association with the first headers, and the length of each of the rewrite headers is greater than 4 bytes, such as 8 bytes, 12 bytes, etc.

Method 1200 may be executed in a system, in one embodiment. for example, the system for writing data using variable-length headers may include a controller and logic integrated with and/or executable by the controller, the logic being configured to: write data to a first write section of a magnetic tape, at least some of the data being written in association with first headers; select some of the data for rewrite based on detected errors; and rewrite the selected data to a rewrite section of the magnetic tape, the rewritten data being written in association with rewrite headers. A length of each of the rewrite headers is greater than a length of each of the first headers.

In a further embodiment, the data may comprise at least one data set, the at least one data set comprising a plurality of sub data sets, each sub data set comprising a data array organized in rows and columns, each row of the data array comprising four interleaved C1 codewords (a CWI-4). The data is stored as a plurality of CWI-4 sets, the length of each the first headers may be less than 12 bytes, and the length of each of the rewrite headers may be at least 12 bytes.

In one approach, the logic may be further configured to write a remaining portion of the data to the first write section of the magnetic tape, that is not written in association with the first headers, in association with second headers. A length of each of the second headers may be equal to the length of each of the first headers, each of the first headers may comprise a first half of a common header, each of the second headers may comprise a second half of the common header, half of the data may be written associated with the first headers in the first write section of the magnetic tape, and another half of the data may be written associated with the second headers in the first write section of the magnetic tape, such that all of the data is written to the first write section with either the first header and the second header.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for writing data using variable-length headerized CWI-4 sets, the system comprising:
   a controller; and
   logic, wherein the logic is at least one of: integrated with the controller as hardware instructions, and executable by the controller, the logic being configured to cause the controller to:
      cause performance of a first write of a data set to a first write section of a magnetic medium, the data set comprising a plurality of sub data sets, each sub data set comprising a data array organized in rows and columns, each row of the data array comprising four interleaved C1 codewords (a CWI-4), wherein a first portion of the data set is stored as CWI-4 sets to the first write section of the magnetic medium with first headers, a CWI-4 set comprising a fixed number of M concurrently written CWI-4s having M corresponding first headers; and
      cause performance of a rewrite of at least some of the data set as rewritten CWI-4 sets to a rewrite section of the magnetic medium, wherein each rewritten CWI-4 set is stored to the rewrite section of the magnetic medium as M rewritten CWI-4s having M corresponding rewrite headers,
      wherein the rewritten CWI-4 sets are determined based on errors being detected in CWI-4s stored in the first write section of the magnetic medium, and
      wherein a length of any one of the rewrite headers is greater than a length of any one of the first headers.

2. The system as recited in claim 1, wherein the data set comprises P CWI-4 sets, wherein P is at least one of: modulo 8, and an integer multiple of M.

3. The system as recited in claim 1, wherein the logic is further configured to cause the controller to detect the errors in the CWI-4s stored in the first write section of the magnetic medium using a read-while-write process.

4. The system as recited in claim 1, wherein a remaining portion of the data set that is stored as CWI-4 sets to the first write section of the magnetic medium are stored as a fixed number of M concurrently written CWI-4s having M corresponding second headers, each of the first headers and the second headers being 4 bytes in length, wherein each of the first headers comprises a first 4 bytes of one of a plurality of 8-byte headers, wherein each of the second headers comprises a second 4 bytes of one of the plurality of 8-byte headers, wherein each 8-byte header is split across every two CWI-4s, wherein half of the CWI-4 sets of the data set are stored as CWI-4s with the first headers in the first write section of the magnetic medium, and wherein half of the CWI-4 sets of the data set are stored as CWI-4s with the second headers in the first write section of the magnetic medium.

5. The system as recited in claim 1, wherein each of the first headers is 4 bytes in length, and wherein all CWI-4 sets are stored to the first write section of the magnetic medium as CWI-4s with corresponding first headers.

6. The system as recited in claim 1, wherein a remaining portion of the data set that is stored as CWI-4 sets to the first write section of the magnetic medium are stored as CWI-4s without any headers.

7. The system as recited in claim 6, wherein each of the first headers is 4 bytes in length, wherein odd numbered CWI-4 sets are stored to the first write section of the magnetic medium as CWI-4s without any headers, wherein even numbered CWI-4 sets are stored to the first write section of the magnetic medium as CWI-4s with corresponding first headers, and wherein the CWI-4 sets stored as CWI-4s without any headers are interleaved with the CWI-4 sets stored as CWI-4s with the corresponding first headers.

8. The system as recited in claim 6, wherein each of the first headers is 8 bytes in length, wherein odd numbered CWI-4 sets are stored to the first write section of the magnetic medium as CWI-4s without any headers, wherein even numbered CWI-4 sets are stored to the first write section of the magnetic medium as CWI-4s with corresponding first headers, and wherein the CWI-4 sets stored as CWI-4s without any headers are interleaved with the CWI-4 sets stored as CWI-4s with the corresponding first headers.

9. The system as recited in claim 6, wherein each of the first headers is 8 bytes in length, wherein a data set comprises 384 CWI-4 sets, wherein 380 CWI-4 sets are stored to the first write section of the magnetic medium as CWI-4s without any headers, and wherein 4 CWI-4 sets are stored to the first write section of the magnetic medium as CWI-4s with corresponding first headers.

10. The system as recited in claim 1, wherein each of the rewrite headers is 12 bytes in length, and wherein the magnetic medium is a magnetic tape housed in a tape cartridge operable in a tape drive.

11. A method for writing data using variable-length headers, the method comprising:
   writing data to a first write section of a magnetic tape, at least some of the data being written in association with first headers;
   selecting some of the data for rewrite based on detected errors; and
   rewriting the selected data to a rewrite section of the magnetic tape, the rewritten data being written in association with rewrite headers,
   wherein a length of each of the rewrite headers is greater than a length of each of the first headers.

12. The method as recited in claim 11, wherein the data comprises at least one data set, the at least one data set comprising a plurality of sub data sets, each sub data set comprising a data array organized in rows and columns, each row of the data array comprising four interleaved C1 codewords (a CWI-4), wherein the data is stored as a plurality of CWI-4 sets, each CWI-4 set comprising a fixed number of M concurrently written CWI-4s having M corresponding first headers, wherein the length of each of the first headers is less than 12 bytes, and wherein the length of each of the rewrite headers is at least 12 bytes.

13. The method as recited in claim 12, further comprising writing a remaining portion of the data to the first write section of the magnetic tape as CWI-4s without headers in CWI-4 sets, wherein each of the first headers is either 4 bytes or 8 bytes in length, wherein odd numbered CWI-4 sets are written to the first write section of the magnetic tape as CWI-4s without any headers, wherein even numbered CWI-4 sets are written to the first write section of the magnetic tape as CWI-4s in association with corresponding first headers, and wherein the CWI-4 sets written as CWI-4s without any headers are interleaved with the CWI-4 sets written as CWI-4s in association with the corresponding first headers.

14. The method as recited in claim 12, wherein each of the first headers is 4 bytes or 8 bytes in length, wherein 380 CWI-4 sets are written to the first write section of the magnetic tape as CWI-4s without any headers, and wherein 4 CWI-4 sets are written to the first write section of the magnetic tape as CWI-4s in association with corresponding first headers.

15. The method as recited in claim 11, further comprising detecting the errors in the data written in the first write section of the magnetic tape using a read-while-write process.

16. The method as recited in claim 11, further comprising writing a remaining portion of the data, that is not written in association with the first headers, to the first write section of the magnetic tape in association with second headers, wherein a length of each of the second headers is equal to the length of each of the first headers, wherein each of the first headers comprise a first half of one of a plurality of common headers, wherein each of the second headers comprise a second half of one of the plurality of common headers, wherein each common header is split across a first header and a second header, wherein half of the data is written associated with the first headers in the first write section of the magnetic tape, and wherein another half of the data is written associated with the second headers in the first write section of the magnetic tape.

17. The method as recited in claim 11, wherein each of the first headers is 4 bytes in length, wherein all of the data is stored to the first write section of the magnetic tape in association with the first headers, and wherein the length of each of the rewrite headers is greater than 4 bytes.

18. A system for writing data using variable-length headers, the system comprising:
   a controller; and
   logic, wherein the logic is at least one of: integrated with the controller as hardware instructions, and executable by the controller, the logic being configured to cause the controller to:
      write data to a first write section of a magnetic tape, at least some of the data being written in association with first headers;
      select some of the data for rewrite based on detected errors; and
      rewrite the selected data to a rewrite section of the magnetic tape, the rewritten data being written in association with rewrite headers,
      wherein a length of each of the rewrite headers is greater than a length of each of the first headers.

19. The system as recited in claim 18, wherein the data comprises at least one data set, the at least one data set comprising a plurality of sub data sets, each sub data set comprising a data array organized in rows and columns, each row of the data array comprising four interleaved C1 codewords (a CWI-4), wherein the data is stored as a plurality of CWI-4 sets, each CWI-4 set comprising a fixed number of M concurrently written CWI-4s having M corresponding first headers, wherein the length of each of the first headers is less than 12 bytes, and wherein the length of each of the rewrite headers is at least 12 bytes.

20. The system as recited in claim 18, wherein the logic is further configured to cause the controller to write a remaining portion of the data, that is not written in association with the first headers, to the first write section of the magnetic tape in association with second headers, wherein a length of each of the second headers is equal to the length of each of the first headers, wherein each of the first headers comprise a first half of one of a plurality of common headers, wherein each of the second headers comprise a second half of one of the plurality of common headers, wherein each common header is split across a first header and a second header, wherein half of the data is written as CWI-4s in association with corresponding first headers in the first write section of the magnetic tape, and wherein another half of the data is written as CWI-4s in association with corresponding second headers in the first write section of the magnetic tape.

* * * * *